(12) United States Patent
Zhang et al.

(10) Patent No.: US 11,963,225 B2
(45) Date of Patent: Apr. 16, 2024

(54) METHOD AND APPARATUS FOR TRANSMITTING AND RECEIVING UPLINK CONTROL INFORMATION

(71) Applicant: FUJITSU LIMITED, Kawasaki (JP)

(72) Inventors: Guoyu Zhang, Beijing (CN); Qinyan Jiang, Beijing (CN); Meiyi Jia, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 286 days.

(21) Appl. No.: 17/361,531

(22) Filed: Jun. 29, 2021

(65) Prior Publication Data

US 2021/0352728 A1 Nov. 11, 2021

Related U.S. Application Data

(63) Continuation of application No. PCT/CN2019/070971, filed on Jan. 9, 2019.

(51) Int. Cl.
*H04W 74/08* (2009.01)
*H04L 1/1812* (2023.01)
(Continued)

(52) U.S. Cl.
CPC ....... *H04W 74/0825* (2013.01); *H04L 1/1819* (2013.01); *H04W 72/0453* (2013.01); *H04W 72/1268* (2013.01); *H04W 74/004* (2013.01)

(58) Field of Classification Search
CPC ......... H04W 74/0825; H04W 72/0453; H04W 72/1268; H04W 74/004; H04W 72/21; H04W 74/0808; H04L 1/1819
See application file for complete search history.

(56) References Cited

U.S. PATENT DOCUMENTS

2017/0339693 A1\* 11/2017 Cierny ................. H04W 24/10
2018/0027549 A1  1/2018 Wang et al.
(Continued)

FOREIGN PATENT DOCUMENTS

CN  106211345 A  12/2016
CN  106559906 A  4/2017
(Continued)

OTHER PUBLICATIONS

Notice of Reasons for Refusal issued by the Japan Patent Office for corresponding Japanese Patent Application No. 2021-538718, dated Aug. 9, 2022, with an English translation.
(Continued)

*Primary Examiner* — Afshawn M Towfighi
(74) *Attorney, Agent, or Firm* — Myers Wolin, LLC

(57) ABSTRACT

A method and apparatus for transmitting and receiving uplink control information. The method includes: determining a channel access type of an uplink control channel used for transmitting uplink control information by a terminal equipment; and detecting a channel according to the channel access type and transmitting the uplink control information to a network device after the channel is detected as being idle, or not detecting a channel according to the channel access type and transmitting the uplink control information to the network device. Hence, in some scenarios, uplink control information may be transmitted without detecting a channel, which may lower latency and improve transmission efficiency; and in some other scenarios, uplink control information may be transmitted after the channel is detected as being idle, which may avoid or lower interference and improve reliability of transmission.

17 Claims, 7 Drawing Sheets

(51) Int. Cl.
*H04W 72/0453* (2023.01)
*H04W 72/1268* (2023.01)
*H04W 74/00* (2009.01)
*H04W 74/0808* (2024.01)

(56) References Cited

U.S. PATENT DOCUMENTS

| | | | |
|---|---|---|---|
| 2018/0220462 A1* | 8/2018 | Kusashima | H04W 74/0816 |
| 2018/0270860 A1* | 9/2018 | Bhorkar | H04W 74/006 |
| 2018/0343663 A1 | 11/2018 | Richards | |
| 2018/0368090 A1* | 12/2018 | Kadambar | H04W 8/005 |
| 2019/0110307 A1* | 4/2019 | Kim | H04W 74/0808 |
| 2019/0268939 A1* | 8/2019 | Yang | H04W 74/08 |
| 2019/0281636 A1* | 9/2019 | Liu | H04W 76/27 |

FOREIGN PATENT DOCUMENTS

| | | |
|---|---|---|
| CN | 107026723 A | 8/2017 |
| CN | 107734560 A | 2/2018 |
| CN | 107949067 A | 4/2018 |
| JP | 2018-510543 A | 4/2018 |
| WO | 2018/106911 A2 | 6/2018 |
| WO | 2018/107458 A1 | 6/2018 |

OTHER PUBLICATIONS

Nokia et al., "Feature Lead's Summary on Channel Access Procedures", Agenda Item: 7.2.2.4.1, 3GPP TSG-RAN WG1 Meeting #95, R1-1813994, Spokane, US, Nov. 12-16, 2018.

Nokia et al., "Channel access and co-existence for NR-U operation", Agenda Item: 7.2.2.4.1, 3GPP TSG-RAN WG1 Meeting #95, R1-1812661, Spokane, US, Nov. 12-16, 2018.

Huawei et al., "Feature lead summary of HARQ enhancement in NR-U", Agenda Item: 7.2.2.4.3, 3GPP TSG-RAN WG1 Meeting #95, R1-1814146, Spokane, USA, Nov. 12-16, 2018.

First Notification of Office Action and search report issued by the China National Intellectual Property Administration for corresponding Chinese Patent Application No. 201980087207.8, dated Jun. 29, 2023, with an English translation.

Huawei et al., "Coexistence and channel access for NR unlicensed band operations", Agenda Item: 7.2.2.4.1, 3GPP TSG-RAN WG1 Meeting #95, R1-1812194, Spokane, US, Nov. 12-16, 2018.

International Search Report and Written Opinion of the International Searching Authority issued by the China National Intellectual Property Administration for corresponding International Patent Application No. PCT/CN2019/070971, dated May 30, 2019, with an English translation.

3GPP TS 37.213 V15.1.0, "3rd Generation Partnership Project; Technical Specification Group Radio Access Network; Physical layer procedures for shared spectrum channel access; (Release 15)", Sep. 2018.

Second Notification of Office Action and Search Report issued by the China National Intellectual Property Administration for corresponding Chinese Patent Application No. 201980087207.8, mailed on Jan. 21, 2024, with an English translation.

Mediatek Inc., "LBT and CAPC for Uplink Control Channels in NR-U", Agenda Item: 11.2.1.3, 3GPP TSG-RAN2 #103-BIS meeting, Tdoc R2-1813679, Chengdu, China, Oct. 8-13, 2018.

* cited by examiner

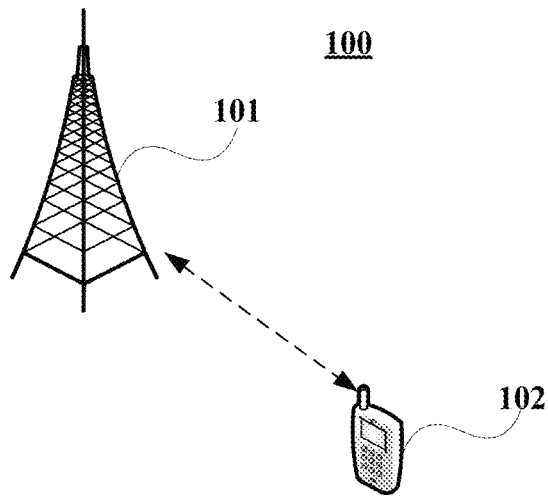

Fig. 1

201 a terminal equipment determines a channel access type of an uplink control channel used for transmitting uplink control information, the channel access type including at least one of the following: a first channel access type not performing channel detection, a second channel access type containing a detection interval, a third channel access type containing a detection interval and a contention window

202 the terminal equipment detects a channel according to the channel access type and transmits the uplink control information to a network device after the channel is detected as being idle, or does not detect a channel according to the channel access type and transmits the uplink control information to the network device

Fig. 2

METHOD AND APPARATUS FOR TRANSMITTING AND RECEIVING UPLINK CONTROL INFORMATION

CROSS-REFERENCE TO RELATED APPLICATION

This application is a continuation application of International Application PCT/CN2019/070971 filed on Jan. 9, 2019 and designated the U.S., the entire contents of which are incorporated herein by reference.

TECHNICAL FIELD

This disclosure relates to the field of communication technologies, and in particular to a method and apparatus for transmitting and receiving uplink control information.

BACKGROUND

A New Radio (NR) system of Release 15 is similar to a Long Term Evolution (LTE) system, which also needs uplink control information (UCI) to support data transmission in uplink/downlink transmission channels. The uplink control information generally includes hybrid automatic repeat request (HARQ) feedback information (such as ACK/NACK), channel state information (CSI), and a scheduling request (SR). The UCI is generally carried in a physical uplink control channel (PUCCH) and transmitted. If uplink data are scheduled simultaneously in a predetermined transmission slot, that is, when a physical uplink shared channel (PUSCH) needs to be transmitted and the PUSCH and one or more resources determined to transmit the PUCCH overlap in time, the UCI will be transmitted on the PUSCH at the slot according to a predefined rule.

The HARQ feedback information is acknowledgement information used to indicate whether a downlink transport block received by a terminal equipment needs to be retransmitted and transmitted by the terminal equipment (or referred to as a user equipment) to a network device (such as a base station). For example, downlink control information (DCI) scheduling a physical downlink shared channel (PDSCH) includes three fields related to the HARQ feedback information.

The first field is "HARQ process number", which is used to indicate the HARQ process number; as it is possible that there may exist multiple PDSCHs awaiting an HARQ feedback or retransmission process during communication, the network device and the terminal equipment may make an agreement on a relationship between HARQ feedback or retransmission and initially transmitted PDSCHs via the HARQ process number.

The second field is "PDSCH-to-HARQ_feedback timing indicator", in which the terminal equipment determines a slot for transmitting the HARQ feedback information of the PDSCH, that is, a value of this field indicates the number of slot offsets of the slot of the terminal equipment for feeding back the HARQ relative to a slot where a last symbol of the scheduled PDSCH is located; when the DCI is of format 1_0, a 3-bit value of this field corresponds to slots {1, 2, 3, 4, 5, 6, 7, 8}, respectively; and when the DCI is of format 1_1, if the field is included, a parameter "dl-DataToUL-ACK" in radio resource control (RRC) signaling is used to configure slot numbers corresponding to indicator values of the field, and if this field is not included, the number of slot offsets fed back by HARQ is a value configured by the RRC signaling.

The third field is "PUCCH resource indicator", which is used to indicate a PUCCH resource used to carry HARQ feedback information at the slot for feeding back the HARQ, the PUCCH resource being one of multiple PUCCH resources configured by the RRC signaling.

CSI reporting may be divided into periodic reporting, semi-persistent reporting and non-periodic reporting. Periodic CSI is transmitted on a PUCCH. Semi-persistent CSI may be configured to be transmitted on a PUCCH or PUSCH, for example, it may be configured on a PUCCH and activated by a media access control (MAC) control element (CE), and then start to transmit on PUCCH in a certain period, and it may also be configured on the PUSCH and activated by DCI scrambled by an SP-CSI-RNTI, and then transmitted on the PUSCH in a certain period. The non-periodic CSI is triggered by a "CSI request" in uplink scheduling granted DCI, and then transmitted on the a PUSCH indicated by the DCI.

The SR is only transmitted on the PUCCH, and the network device may configure the terminal equipment with periodic PUCCH resources for transmitting the SR via RRC signaling.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

It was found by the inventors that in LTE LAA, although the uplink transmission of the unlicensed band is introduced from Release 14, it only supports transmission of PUSCHs but does not support transmission of PUCCHs. In UCI, only CSI may be transmitted on a PUSCH of a cell of an unlicensed spectrum, and HARQ feedback information and SR are only allowed to be transmitted in a cell of the licensed spectrum. In a work project of NR-based access to unlicensed spectrum (NR-U), a scenario where independent operation of an NR-U cell is supported, and in this scenario, all HARQ feedback information, SR and CSI need to be transmitted on an unlicensed spectrum.

However, in order to ensure fairness of utilization of unlicensed spectrum, a transmitting device needs to perform listen before talk (LBT), that is, detecting whether a channel (hereinafter referred to as channel detection) is idle before transmitting information, and information may only be transmitted when the channel is deemed as being idle. In addition, when a device occupies a channel via channel detection, it may share the occupied channel time with another device, and when an interval between information transmitted by the two devices is less than a threshold, a device sharing a channel time of another device may directly transmit information without performing channel detection. UCI is very important to ensuring correct transmission of uplink and downlink data. What method a terminal equipment is to use to access to a channel before transmitting a PUCCH and how the terminal equipment determines a channel access method used before transmitting the PUCCH become problem to be solved.

Addressed to at least one of the above problems, embodiments of this disclosure provide a method and apparatus for transmitting and receiving uplink control information.

According to a first aspect of the embodiments of this disclosure, there is provided a method for transmitting uplink control information, including:

determining, by a terminal equipment, a channel access type of an uplink control channel used for transmitting uplink control information, the channel access type including at least one of the following: a first channel access type not performing channel detection, a second channel access type containing a detection interval, a third channel access type containing a detection interval and a contention window; and detecting a channel by the terminal equipment according to the channel access type and transmitting the uplink control information to a network device after the channel is detected as being idle, or not detecting a channel according to the channel access type and transmitting the uplink control information to the network device.

According to a second aspect of the embodiments of this disclosure, there is provided an apparatus for transmitting uplink control information, including:

a determining unit configured to determine a channel access type of an uplink control channel used for transmitting uplink control information, the channel access type including at least one of the following: a first channel access type not performing channel detection, a second channel access type containing a detection interval, a third channel access type containing a detection interval and a contention window; and a transmitting unit configured to detect a channel according to the channel access type and transmit the uplink control information to a network device after the channel is detected as being idle, or not to detect a channel according to the channel access type and transmit the uplink control information to the network device.

According to a third aspect of the embodiments of this disclosure, there is provided a method for receiving uplink control information, including:

receiving, by a network device, uplink control information transmitted by a terminal equipment, the uplink control information being transmitted after the terminal equipment performs channel detection according to a channel access type of the uplink control channel and the channel is detected as being idle, or being transmitted without performing channel detection according to the channel access type;

the channel access type including at least one of the following: a first channel access type not performing channel detection, a second channel access type containing a detection interval, a third channel access type containing a detection interval and a contention window.

According to a fourth aspect of the embodiments of this disclosure, there is provided an apparatus for receiving uplink control information, including:

a receiving unit configured to receive uplink control information transmitted by a terminal equipment, the uplink control information being transmitted after the terminal equipment performs channel detection according to a channel access type of the uplink control channel and the channel is detected as being idle, or being transmitted without performing channel detection according to the channel access type;

the channel access type including at least one of the following: a first channel access type not performing channel detection, a second channel access type containing a detection interval, a third channel access type containing a detection interval and a contention window.

According to a fifth aspect of the embodiments of this disclosure, there is provided a communication system, including:

a terminal equipment configured to determine a channel access type of an uplink control channel used for transmitting uplink control information, and transmit the uplink control information to a network device after channel detection is performed according to the channel access type the channel is detected as being idle, or not to detect a channel according to the channel access type and transmit the uplink control information to the network device; and a network device configured to receive the uplink control information transmitted by the terminal equipment; wherein the channel access type includes at least one of the following: a first channel access type not performing channel detection, a second channel access type containing a detection interval, a third channel access type containing a detection interval and a contention window.

An advantage of the embodiments of this disclosure exists in that the terminal equipment determines a channel access type of an uplink control channel used for transmitting uplink control information, and detects a channel according to the channel access type and transmits the uplink control information to a network device after the channel is detected as being idle, or does not detect a channel according to the channel access type and transmits the uplink control information to the network device. Hence, in some scenarios, uplink control information may be transmitted without detecting a channel, which may lower latency and improve transmission efficiency; and in some other scenarios, uplink control information may be transmitted after the channel is detected as being idle, which may avoid or lower interference and improve reliability of transmission.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 1 is schematic diagram of a communication system of an embodiment of this disclosure;

FIG. 2 is a schematic diagram of the method for transmitting uplink control information of an embodiment of this disclosure;

DETAILED DESCRIPTION OF THE DISCLOSURE

Figure 3:
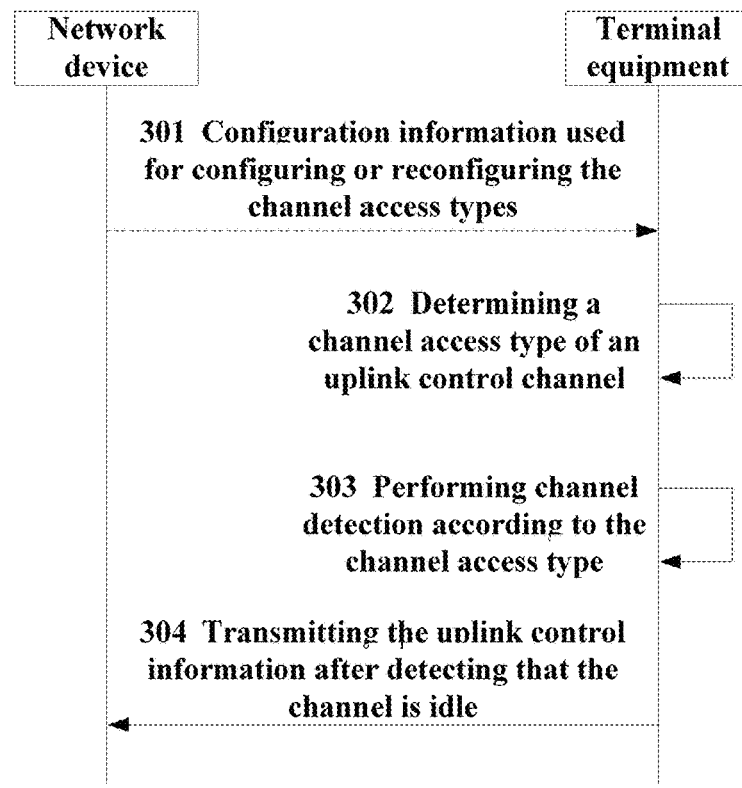
FIG. 3 is a schematic diagram of a method for transmitting and receiving uplink control information of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102. For the sake of simplicity, description is given in FIG. 1 by taking one terminal equipment and one network device as an example; however, this embodiment is not limited thereto.

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

Embodiment 1

The embodiments of this disclosure provide a method for transmitting uplink control information, which shall be described from a terminal equipment (i.e. a side where uplink control information is transmitted, which may also be referred to as a user equipment) side.

FIG. 2 is a schematic diagram of the method for transmitting uplink control information of the embodiment of this disclosure, which shall be described from a terminal equipment side. As shown in FIG. 2, the method includes:

step 201: a terminal equipment determines a channel access type of an uplink control channel used for transmitting uplink control information, the channel access type including at least one of the following: a first channel access type not performing channel detection, a second channel access type containing a detection interval, a third channel access type containing a detection interval and a contention window; and step 202: the terminal equipment detects a channel according to the channel access type and transmitting the uplink control information to a network device after the channel is detected as being idle, or does not detect a channel according to the channel access type and transmitting the uplink control information to the network device.

In an embodiment, the uplink control information is transmitted by using an unlicensed spectrum; however, this disclosure is not limited thereto, and it may also be applicable to a scenario of a licensed spectrum. In addition, there is no strict distinction between "channel" and "information" in this disclosure. For example, "an uplink control channel" may refer to a PUCCH carrying UCI, or may refer to UCI. Transmitting uplink control information may be referred to as transmitting an uplink control channel, and receiving uplink control information may also be referred to as receiving an uplink control channel; for example, "transmitting uplink control channel" may be understood as "transmitting UCI by a UE to a base station via a PUCCH", and "receiving an uplink control channel" may be understood as "receiving UCI transmitted by a UE by a base station via a PUCCH".

It should be noted that FIG. 2 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 2.

In an embodiment, the first channel access type not performing channel detection may indicate that the information is directly transmitted without detecting whether the channel is idle. The detection interval included in the second channel access type may be, for example, 25 us, that is, the second channel access type may indicate that whether the channel is idle is detected within the detection interval of 25 us, and if the channel is detected as being idle, the transmitting device transmits the information immediately after the detection interval; and if it is detected as being busy, the information is not transmitted. And the third channel access type may indicate that the channel is detected within a detection interval (such as 25 us) included in the third channel access type, if it is determined to be idle, continue to detect a time of a contention window, and if it is still idle, the transmitting device transmits the information; otherwise, the information is not transmitted. For example, the contention window may include at least one time interval and a counter is used for counting. An initial value of the counter is equal to the number of time intervals included in the contention window, and when a time interval is detected as being idle, the counter is subtracted by 1, otherwise, the channel is deemed as being busy; and after the counter is subtracted to 0, it is deemed that the channel is idle and information may be transmitted.

It should be noted that the channel access types in the embodiment of this disclosure are illustrated above only; however, this disclosure is not limited thereto. For example, the time interval is not limited to 25 us, or the time interval (detection interval) and/or time window (contention window) is/are set to be multiple, hence, more than three channel access types may be included.

In an embodiment, the terminal equipment may receive configuration information used for configuring or reconfiguring the channel access types transmitted by the network device.

FIG. 3 is a schematic diagram of a method for transmitting and receiving uplink control information of the embodiment of this disclosure, which shall be described from a transmission side and a reception side. As shown in FIG. 3, the method includes:

step 301: a network device transmits configuration information used for configuring or reconfiguring the channel access types to a terminal equipment;

step 302: the terminal equipment determines a channel access type of an uplink control channel used for transmitting uplink control information;

for example, the channel access type is the second channel access type or the third channel access type;

step 303: the terminal equipment performs channel detection according to the channel access type; and step 304: the terminal equipment transmits the uplink control information to the network device after detecting that the channel is idle.

Figure 4:
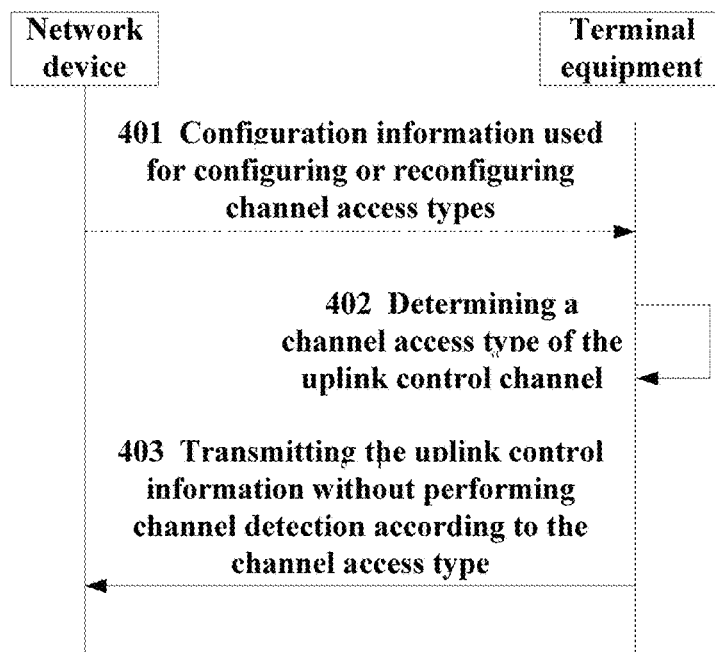
FIG. 4 is another schematic diagram of the method for transmitting and receiving uplink control information of the embodiment of this disclosure.

FIG. 4 is a schematic diagram of a method for transmitting and receiving uplink control information of the embodiment of this disclosure, which shall be described from a transmission side and a reception side. As shown in FIG. 4, the method includes:

step 401: the network device transmits configuration information used for configuring or reconfiguring channel access types to the terminal equipment;

step 402: the terminal equipment determines a channel access type of the uplink control channel used for transmitting the uplink control information;

for example, the channel access type is the first channel access type;

step 403: the terminal equipment does not detect a channel according to the channel access type and transmits the uplink control information to the network device.

It should be noted that FIGS. 3 and 4 only schematically illustrate the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what are contained in FIGS. 3 and 4.

In an embodiment, the configuration information is transmitted via a system message and/or radio resource control (RRC) signaling. The channel access types may be configured via the system message, or the channel access types may be configured via UE-specific PUCCH configuration signaling; or the channel access types may be configured via the system message, and the channel access type may be reconfigured via UE-specific PUCCH configuration signaling.

For example, a system information block 1 (SIB1) transmitted by the network device includes a parameter 'PUCCH-channelaccesstype', which is used to configure the terminal equipment receiving the SIB1 with a channel access type for transmitting a PUCCH; the terminal equipment transmits the PUCCH by using the channel access type configured by this parameter; in addition, a change of the PUCCH channel access type may also be indicated by the parameter in SIB1.

In an embodiment, a parameter may be included in RRC signaling to indicate a channel access type of the terminal equipment in transmitting a PUCCH.

For example, UE-specific PUCCH configuration includes a parameter 'channelaccesstype' indicating the channel access type of the terminal equipment in transmitting the PUCCH. For example, it indicates the second channel access type with a detection interval of 25 us. After the RRC signaling takes effect, the terminal equipment transmits the PUCCH by using the second channel access type with a detection interval of 25 us.

For another example, when the terminal equipment does not have specific PUCCH configuration, that is, the network device has not configured specific PUCCH configuration for the terminal equipment or before the PUCCH configuration takes effect, the terminal equipment transmits the PUCCH by using a default channel access type, and the default channel access type may be the third channel access type (i.e. the third channel access type with a minimal initial value of the counter) having a highest priority and containing a detection interval and a contention window, or the default channel access type is the second channel access type with a detection interval of 25 us. Or, when the terminal equipment does not have specific PUCCH configuration, the network device configures the terminal equipment with a channel access type for transmitting the PUCCH.

For a further example, the UE-specific PUCCH configuration may be 'PUCCH-config' in NR, that is, 'PUCCH-config' is commonly used in licensed and unlicensed spectrum, then a channel access type parameter 'channelaccesstype' is configured only when a cell is a cell of an unlicensed spectrum, the channel access type parameter being a conditional optional parameter. Or, this parameter will only be configured when a format of the unlicensed spectrum is configured in 'PUCCH-config'; for example, format 5 is a PUCCH format type used by an NR unlicensed spectrum, then when format 5 is configured in 'PUCCH-config', the parameter 'channelaccesstype' will be configured in 'PUCCH-config'. Or, the NR unlicensed spectrum does not have a specific format type but reuses a format type in NR, when a format is configured in the NR unlicensed spectrum, the parameter 'channelaccesstype' will be configured; for example, format 2 is configured as a PUCCH transmission format of an unlicensed spectrum, then the network device will configure the parameter 'channelaccesstype' for the terminal equipment.

Table 1 below exemplarily shows situations where the 'PUCCH-config' configuration is commonly used in a licensed spectrum and an unlicensed spectrum.

TABLE 1

```
PUCCH-Config ::=              SEQUENCE {
    resource SetToAddModList   SEQUENCE (SIZE (1..maxNrofPUCCH-Resource Sets)) OF PUCCH-ResourceSet
OPTIONAL,     -- Need N
    resourceSetToReleaseList  SEQUENCE (SIZE (1..maxNrofPUCCH-Resource Sets)) OF PUCCH-Resource SetId
OPTIONAL,     -- Need N
    resourceToAddModList      SEQUENCE (SIZE (1..maxNrofPUCCH-Resources)) OF PUCCH-Resource
OPTIONAL,     -- Need N
    resourceToReleaseList     SEQUENCE (SIZE (1..maxNrofPUCCH-Resources)) OF PUCCH-ResourceId
OPTIONAL,     -- Need N
        format1   SetupRelease { PUCCH-FormatConfig }      OPTIONAL,    -- Need M
        format2   SetupRelease { PUCCH-FormatConfig }      OPTIONAL,    -- Need M
        format3   SetupRelease { PUCCH-FormatConfig }      OPTIONAL,    -- Need M
        format4   SetupRelease { PUCCH-FormatConfig }      OPTIONAL,    -- Need M
    format5-NRU SetupRelease { PUCCH-FormatConfig }        OPTIONAL,    --Need M
    channelaccesstype-NRU  CHOICE {type1, type2, type3}   Optional,    --Cond NR-U
                    ---------------------------Others are omitted---------------------------
    ...
}
```

For still another example, the UE-specific PUCCH configuration may also be PUCCH configuration specific for an unlicensed spectrum, such as 'PUCCH-configNRU'.

Table 2 below exemplarily shows a situation of PUCCH configuration specific for an unlicensed spectrum.

TABLE 2

```
PUCCH-ConfigNRU ::=                    SEQUENCE {
    format-NRU   SetupRelease { PUCCH-FormatConfig }   OPTIONAL,   --Need M
    channelaccesstype-NRU    CHOICE {type1, type2, type3}
            ---------------------------Others are omitted--------------------------
}
```

In an embodiment, a channel access type may be configured or reconfigured for at least one PUCCH resource via RRC signaling. At least two PUCCH resources are independently configured with the channel access type respectively, or formats of at least two PUCCH resources are independently configured with the channel access type separately.

For example, "PUCCH-resource" contains configuration of a channel access type, and when the terminal equipment uses a PUCCH resource to transmit the PUCCH, a channel access type configured in "PUCCH-resource" is used to transmit the PUCCH. For example, in the configuration of SR or CSI reporting, a PUCCH resource is configured via 'PUCCH-ResourceId' for the PUCCH transmitting the SR or CSI, and the channel access type configured in 'PUCCH-resource' configuration of this resource is the second channel access type with a detection interval of 25 us, then the terminal equipment uses the second channel access type with a detection interval of 25 us in transmitting the PUCCH carrying the SR or CSI by using the PUCCH resource. The PUCCH resource of the HARQ feedback information may be indicated according to a field "PUCCH resource indicator" in the DCI and determined according to a size of the UCI. After determining a PUCCH resource, the channel access type is determined according to the configuration information.

Table 3 exemplarily shows a situation of configuring a channel access type in 'PUCCH-resource'.

TABLE 3

```
PUCCH-Resource ::=            SEQUENCE {
    pucch-ResourceId              PUCCH-ResourceId,
    startingPRB                   PRB-Id,
    channelaccesstype             CHOICE {type1, type2, type3}
    intraSlotFrequencyHopping     ENUMERATED { enabled }   OPTIONAL, -- Need R
    secondHopPRB                  PRB-Id                    OPTIONAL, -- Need R
    format                        CHOICE {
        format0                       PUCCH-format0,
        format1                       PUCCH-format1,
        format2                       PUCCH-format2,
        format3                       PUCCH-format3,
        format4                       PUCCH-format4
        formatX(or formatNRU)         PUCCH-formatX(or PUCCH-formatNRU)
    }
}
```

For yet another example, as a PUCCH resource has only one format type, the channel access type may also be configured in format configuration contained in the PUCCH resource.

Table 4 exemplarily shows a situation of configuring a channel access type in 'PUCCH-formatX'.

TABLE 4

```
PUCCH-formatX(or PUCCH-formatNRU) ::=                    SEQUENCE {
    channelaccesstype              CHOICE {type1, type2, type3}
    nrofSymbols                    INTEGER (1..2),
    startingSymbolIndex            INTEGER(0..13)
            ----------------------------Others are omitted--------------------------
}
```

In an embodiment, the channel access type may be determined at least according to a format and/or duration of a PUCCH resource. That is, a configurable channel access type may be limited according to the format of the PUCCH resource, or a configurable channel access type may be limited according to the duration of the PUCCH resource.

For example, a PUCCH format with a short duration (such as less than 3 OFDM symbols) may be configured with the first channel access type without performing channel detection or the second channel access type with a detection interval of 25 us; and a PUCCH format with a long duration (such as greater than or equal to 3 OFDM symbols) may be configured with the second channel access type with a detection interval of 25 us or the third channel access type including a detection interval and a contention window, but may not be configured with the first channel access type without performing channel detection, because the first channel access type without performing channel detection needs that the network device shares the occupied channel with the terminal device after accessing to the channel, so that the terminal equipment may directly transmit the uplink information without performing channel detection. However, if the terminal equipment performing no channel detection occupies the channel for a long time, it will affect the fairness of accessing to the channel by surrounding devices. Therefore, it is necessary to specify that uplink information (at least one of data information, control information, a PUSCH, a PUCCH) occupying a channel for a long time shall not access to the channel without performing channel detection.

For another example, a configurable duration of PUCCH format 2 is 0, 1 and 2 symbols, and a channel occupation time is short after accessing to the channel, hence, the first channel access type without performing channel detection or the second channel access type with a detection interval of 25 us may be configured. A configurable duration of PUCCH format 3 is within a range of 4-14 symbols, and a maximum time length needed in occupying the channel after accessing to the channel is 1 ms. Therefore, the PUCCH resource of this format may only be configured with the second channel access type with a detection interval of 25 us or the third channel access type including a detection interval and a contention window.

Table 5 exemplarily shows a situation where a channel access type is limited according to a format.

TABLE 5

```
PUCCH-format2 ::=                     SEQUENCE {
    channelaccesstype              CHOICE {type1, type2}
    nrofSymbols                    INTEGER (1..2),
    startingSymbolIndex            INTEGER(0..13)
            ----------------------------Others are omitted--------------------------
}
PUCCH-format3 ::=                     SEQUENCE {
    channelaccesstype              CHOICE {type2, type3}
```

TABLE 5-continued

```
    nrofSymbols                    INTEGER (4..14),
    startingSymbolIndex            INTEGER(0..10)
            ----------------------------Others are omitted--------------------------
}
```

For a further example, when the duration of the PUCCH resource is less than a predefined value, the first channel access type without performing channel detection may be configured, and when the duration is greater than the predefined value, the first channel access type without performing channel detection may not be configured. Wherein, the predefined value may be a time interval in units of number of symbols, that is, the number of symbols independent of a subcarrier spacing, such as 6 orthogonal frequency division multiplexing (OFDM) symbols; and the predefined value may also be an absolute time interval, which may be reflected by numbers of subcarrier spacings (SCSs) and symbols. For example, the predefined value is 0.5 ms, the number of OFDM symbols at a subcarrier spacing of 15 kHz is 7, the number of OFDM symbols at a subcarrier spacing of 30 kHz is 14, and the number of OFDM symbols at a subcarrier spacing of 60 kHz is 28. After the terminal equipment receives the RRC signaling of the network device, it may determine the configured channel access type according to the subcarrier spacing and configuration information of the PUCCH resource.

In an embodiment, the channel access type adopted by the PUCCH carrying at least one type of UCI may be configured or reconfigured for the at least one type of UCI via RRC signaling, the UCI including at least one or more types of the following: HARQ feedback information, CSI, SR; wherein at least two types of UCI are independently configured with the channel access type.

For example, since functions and periods of the SR, CSI and HARQ in the UCI are different, the manner for configuring channel access types may also be configuring respective channel access modes for the SR, CSI, and HARQ. A parameter (such channelaccess-SR) for configuring the channel access type may be added into the resource configuration SchedulingRequestResourceConfig, and the channel access type may be configured for the PUCCH carrying the SR. A parameter (such as channelaccess-CSI) may be added into the CSI report configuration 'CSI-ReportConfig' to configure the channel access type used when the CSI is carried by the PUCCH. A parameter may be added into the PUCCH configuration to configure the channel access type for the PUCCH carrying the HARQ feedback information; this parameter may be channelaccess-ACK, a size of this parameter is identical to a size of dl-DataToUL-ACK, and corresponds thereto in a one-to-one manner. When a 'PDSCH-to-HARQ_feedback timing indicator' field in the DCI scheduling the PDSCH indicates an HARQ feedback slot interval configured by 'dl-DataToUL-ACK', according to a sequence of the slot interval in 'dl-DataToUL-ACK', it may be determined that a channel access type of a corresponding sequence in the channel access type configuration is the channel access type employed by the PUCCH transmitting HARQ feedback information. For example, if the 'PDSCH-to-HARQ_feedback timing indicator' field indicates a third slot interval value configured in 'dl-DataToUL-ACK' configuration, it may be determined that its corresponding channel access type is the third channel access type configured by the channel access type parameter. When the terminal equipment does not have valid 'dl-DataToUL-ACK' configuration, it may transmit the PUCCH by using the predefined channel access type.

Or, as the CSI and SR on the PUCCH are transmitted periodically or semi-persistently, the CSI and SR may use a predefined channel access type, and as the HARQ feedback information is related to dynamic scheduling, its channel access type may be configured and indicated in any of the above manners. Or, only the SR adopts the predefined channel access type, and other UCI is configured in the above manner.

Table 6 exemplarily shows a situation where a channel access type is configured for the PUCCH carrying the HARQ feedback information.

TABLE 6

```
PUCCH-Config ::=     SEQUENCE {
   format1   SetupRelease { PUCCH-FormatConfig }   OPTIONAL,   -- Need M
   format2   SetupRelease { PUCCH-FormatConfig }   OPTIONAL,   -- Need M
   format3   SetupRelease { PUCCH-FormatConfig }   OPTIONAL,   -- Need M
   format4   SetupRelease { PUCCH-FormatConfig }   OPTIONAL,   -- Need M
   dl-DataToUL-ACK  SEQUENCE (SIZE (1...8)) OF (0...15) OPTIONAL,  -- Need M
   channelaccesstype-ack  SEQUENCE (SIZE (1...8))OF ChannelaccesstypeConig
          ----------------------------Others are omitted--------------------------
   ...
}
ChannelaccesstypeConig ::= CHOICE {type1,type2,type3}
```

Table 7 exemplarily shows a situation of mapping between the 'PDSCH-to-HARQ_feedback timing indicator' field, the number of slot and a channel access type.

TABLE 7

| PDSCH-to-HARQ_feedback timing indicator | | | | |
|---|---|---|---|---|
| 1 bit | 2 bits | 3 bits | Number of slots k | Channel access type |
| '0' | '00' | '000' | $1^{st}$ value provided by dl-DataToUL-ACK | $1^{st}$ value provided by Channelaccess-ACK |
| '1' | '01' | '001' | $2^{nd}$ value provided by dl-DataToUL-ACK | $2^{nd}$ value provided by Channelaccess-ACK |
| | '10' | '010' | $3^{rd}$ value provided by dl-DataToUL-ACK | $3^{rd}$ value provided by Channelaccess-ACK |
| | '11' | '011' | $4^{th}$ value provided by dl-DataToUL-ACK | $4^{th}$ value provided by Channelaccess-ACK |
| | | '100' | $5^{th}$ value provided by dl-DataToUL-ACK | $5^{th}$ value provided by Channelaccess-ACK |
| | | '101' | $6^{th}$ value provided by dl-DataToUL-ACK | $6^{th}$ value provided by Channelaccess-ACK |
| | | '110' | d$7^{th}$ value provided by dl-DataToUL-ACK | $7^{th}$ value provided by Channelaccess-ACK |
| | | '111' | $8^{th}$ value provided by dl-DataToUL-ACK | $8^{th}$ value provided by Channelaccess-ACK |

For another example, for the RRC configuration of the PUCCH, as the unlicensed spectrum needs to satisfy a demand for specified occupied channel bandwidth (OCB), there will exist an interlace parameter in the PUCCH format configuration of the unlicensed spectrum, the interlace parameter configuring that PUCCH frequency domain resources are distributed at intervals on the PUCCH occupied bandwidth. For example, PUCCH-formatNRU (or PUCCH-format X, where X is a value, such as format 5) contains interlace parameters.

Table 8 exemplarily shows a situation of configuring a channel access type by using interlace parameters.

TABLE 8

```
PUCCH-formatNRU(or PUCCH-formatX) ::=   SEQUENCE {
   interlace                INTEGER(0..N)
   nrofSymbols              INTEGER (1..2),
   startingSymbolIndex      INTEGER(0..13)
          ----------------------------Others are omitted--------------------------
}
```

In an embodiment, at least two of the channel access types may be configured via RRC signaling, and one of the at least two channel access types may be activated via a medium access control (MAC) control element (CE).

For example, a group of channel access types are configured in the PUCCH configuration 'PUCCH-config'. For example, the RRC signaling configures two channel access types, one is the first channel access type without performing channel detection, and the other is the third channel access type including the detection interval and contention window and giving the counter size of the contention window, one of the channel access types being activated by the MAC CE. After activating by the MAC CE and before a next time of activation, the terminal equipment transmits the PUCCH by using the activated channel access type. And before the terminal equipment receives the MAC CE or before the MAC CE takes effect, the terminal equipment transmits the PUCCH by using the default channel access type. Or before the RRC signaling takes effect, the default channel access type is used, and after the RRC signaling takes effect and before there is a valid MAC CE, the terminal equipment transmits the PUCCH by using the first channel access type configured by the RRC signaling or the last channel access type configured by the RRC signaling.

The method for activating by the MAC CE makes the channel access type for transmitting the PUCCH to be semi-persistent. One channel access type is used for a period of time, and if the surrounding environment changes or the scheduling mode changes over time, the channel access type may be modified via the MAC CE so as to achieve semi-persistent adaptation.

In an embodiment, the configuration information is transmitted via downlink control information (DCI), wherein the DCI indicates the channel access type of the PUCCH carrying the HARQ feedback information.

For example, since the PUCCH resources of the transmitted SR and CSI are all periodical or semi-persistent presentations, the channel access type may be configured in the above configuration method or a predefined channel access type may be used, and as the HARQ feedback information is transmitting following dynamic scheduling of the PDSCH, the channel access type of the PUCCH carrying the HARQ feedback information may be indicated by the DCI.

For example, the DCI contains a channel access type indicator field, the channel access type indicator field being used to indicate the channel access type of the PUCCH transmitting the HARQ feedback information.

For another example, the "PDSCH-to-HARQ_feedback timing indicator" field may be reused, and a part of an indicator value in the field is predefined to indicate a channel access type.

Table 9 exemplarily shows a situation where the indicator value of the "PDSCH-to-HARQ_feedback timing indicator" field is used to indicate a channel access type.

TABLE 9

| PDSCH-to-HARQ_feedback timing indicator | | | | |
|---|---|---|---|---|
| 1 bit | 2 bits | 3 bits | Number of slots k | Channel access type |
| '0' | '00' | '000' | xxx | Type 1 |
| '1' | '01' | '001' | xxx | Type 2 |
| | '10' | '010' | xxx | Type 2 |
| | '11' | '011' | xxx | Type 2 |
| | | '100' | xxx | Type 3 |
| | | '101' | xxx | Type 3 |
| | | '110' | xxx | Type 3 |
| | | '111' | xxx | Type 3 |

In an embodiment, the channel access type may be predefined. That is, the channel access type before the PUCCH is transmitted is predefined.

For example, it is predefined in standards that no channel detection is performed before the PUCCH is transmitted. If the predefined channel access type is not performing channel detection, the PUCCH is always transmitted within the channel occupation time obtained by the network device by channel detection. The network device needs to ensure that the channel is occupied by downlink data transmitted by the network device or uplink data granted by the network device before the PUCCH is transmitted, and/or the network device needs to ensure that an interval between any two transmissions before the PUCCH is transmitted is not greater than 16 us. Or, it is predefined the PUCCH is transmitted by using the second channel access type with a detection interval of 25 us.

It should be noted that the above embodiments only illustrate this disclosure. However, this disclosure is not limited thereto, and appropriate variants may be made on the basis of these embodiments. For example, the above embodiments may be executed separately, or one or more of them may be executed in a combined manner.

Moreover, above tables 1-9 only illustrate the embodiment of this disclosure. However, this disclosure is not limited thereto, and appropriate variants may be made on the basis of the contents of tables 1-9, and such variants are all within the coverage of the embodiment of this disclosure.

It can be seen from the above embodiments that the terminal equipment determines a channel access type of an uplink control channel used for transmitting uplink control information, and detects a channel according to the channel access type and transmits the uplink control information to a network device after the channel is detected as being idle, or does not detect a channel according to the channel access type and transmits the uplink control information to the network device. Hence, in some scenarios, uplink control information may be transmitted without detecting a channel, which may lower latency and improve transmission efficiency; and in some other scenarios, uplink control information may be transmitted after the channel is detected as being idle, which may avoid or lower interference and improve reliability of transmission.

Embodiment 2

The embodiments of this disclosure provide an information indication method, which may be carried out separately, or may be carried out in conjunction with Embodiment 1.

Figure 5:
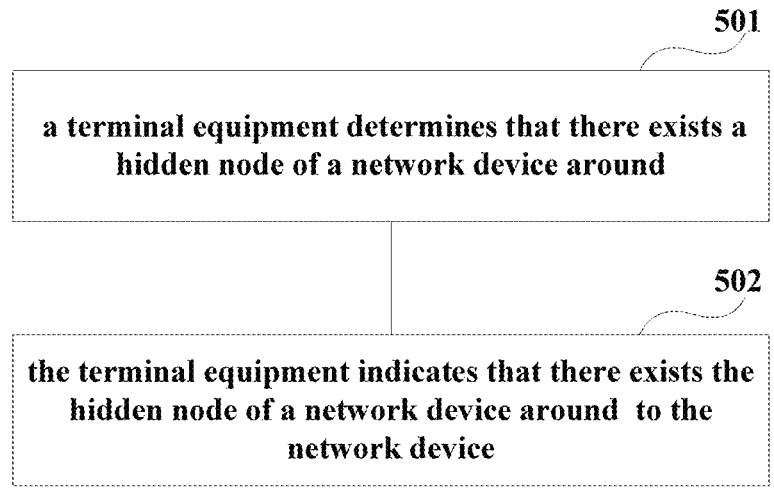
FIG. 5 is a schematic diagram of the information indication method of an embodiment of this disclosure.

FIG. 5 is a schematic diagram of the information indication method of the embodiment of this disclosure. As shown in FIG. 5, the method includes:

step 501: a terminal equipment determines that there exists a hidden node of a network device around; and step 502: the terminal equipment indicates that there exists the hidden node of a network device around to the network device.

In an embodiment, the terminal equipment may explicitly transmit indication information to the network device so as to indicate that there exists the hidden node of the network device around. However, this disclosure is not limited thereto. For example, if the network device transmits detection information and the terminal equipment makes no response, the network device determines that there exists a hidden node around the terminal equipment; that is, the terminal equipment may also implicitly indicate that there exists a hidden node around by making no response. The indication information transmitted by the terminal equipment, sounding information transmitted by the network device and a response message of the terminal equipment to the network detection information may be a predefined sequence or a piece of indication signaling.

In an embodiment, the hidden node of the network device may be one or more transmission devices; and when the transmission device(s) transmit(s) signals, the network device is unable to detect that a channel is occupied by the transmission device(s), and the terminal equipment is able to detect that a channel is occupied by the transmission device(s). For example, a transmission node existing around a UE that the UE is able to detect but a base station is unable to detect is referred to as a hidden node of the base station.

In an embodiment, the terminal equipment determines that uplink control information is not transmitted by using a first channel access type not performing channel detection, or the terminal equipment does not expect that the network device schedules uplink transmission of the first channel access type not performing channel detection.

In an embodiment, the terminal equipment determines that scheduling information of the network device is wrong information when there exists a hidden node of the network device around and the scheduling information of the network device is received, the scheduling information scheduling uplink transmission of the first channel access type not performing channel detection.

For example, when the UE notifies that there exists a hidden node of the base station around the base station, or the base station determines that there exists a hidden node thereof around the UE via information exchange, the UE does not expect the base station to schedule uplink transmission without performing channel idle detection. That is, as the base station is unable to detect whether the hidden node occupies a channel, if the UE is scheduled to perform uplink transmission without performing channel detection, it will result in unfairness of using an unlicensed spectrum by the hidden node.

Figure 6:
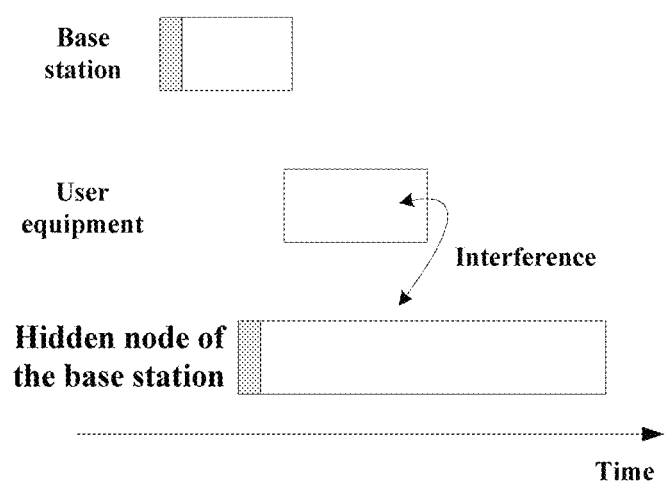
FIG. 6 is a schematic diagram of generating interference by a hidden node of the embodiment of this disclosure.

FIG. 6 is a schematic diagram of generating interference by the hidden node of the embodiment of this disclosure. As shown in FIG. 6, for example, the base station occupies a channel by detecting that the channel is idle, and schedules the UE to transmit uplink transmission without performing channel detection within the channel occupancy time of this time of transmission. However, as the base station and the hidden nodes of the base station cannot detect each other, the hidden node has detected that the channel is idle during the transmission process of the base station and performs signal transmission, and after the UE receives the indication of the base station scheduling to perform uplink transmission without performing channel detection, when the scheduled information is transmitted at a corresponding time point, it will interfere with transmission of the hidden node, causing degradation of transmission quality thereof. Therefore, in the case where the hidden node exists, the base station is unable to schedule the UE to transmit the uplink transmission without performing channel detection, and if the UE receives such scheduling, it is deemed that a scheduling error occurs.

In an embodiment, the terminal equipment may transmit information indicating that the channel is idle to the network device.

Figure 7:
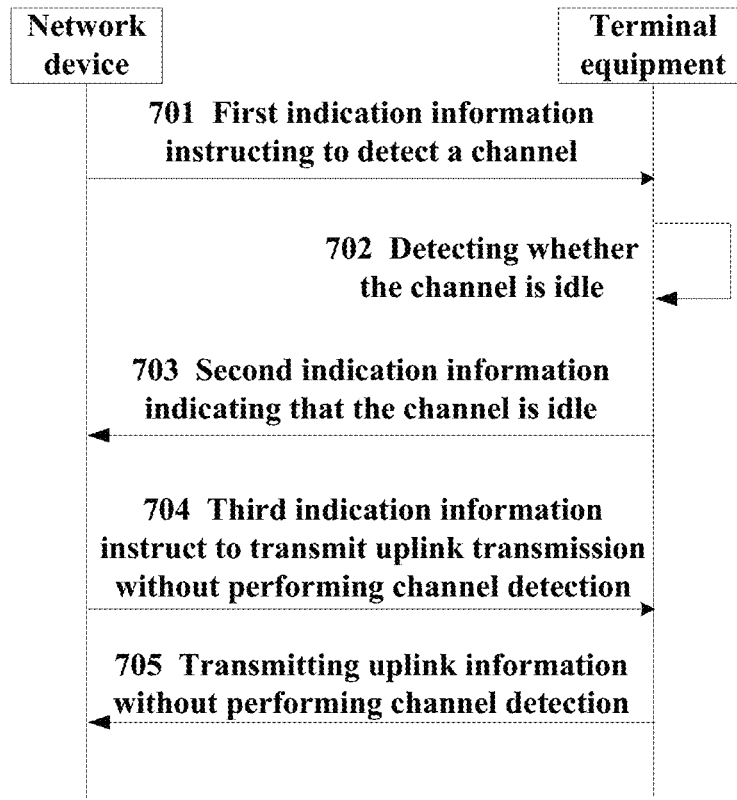
FIG. 7 is another schematic diagram of the information indication method of the embodiment of this disclosure.

FIG. 7 is another schematic diagram of the information indication method of the embodiment of this disclosure. As shown in FIG. 7, the method includes:

step 701: the network device transmits first indication information instructing the terminal equipment to detect a channel to the terminal equipment; and step 702: the terminal equipment detects whether the channel is idle.

As shown in FIG. 7, the method may further include:

step 703: the terminal equipment transmits second indication information indicating that the channel is idle to the network device when the channel is detected as being in an idle state; and step 704: the network device transmits third indication information to instruct the terminal equipment to transmit uplink transmission of the first channel access type without performing channel detection.

In an embodiment, the first indication information in step 701 may be regarded as sounding information transmitted by the network device, and is used to instruct the terminal equipment to determine whether there exists a hidden node of the network device around. The terminal equipment does not transmit the second indication information when the channel is detected as being busy, and by not receiving the second indication information, the network device determines that there exists a hidden node and the channel is busy. For example, as described above, existence of a hidden node around may be indicated by making no response.

Moreover, the first indication information transmitted by the network device and/or the second indication information transmitted by the terminal equipment may be a predefined sequence symbol/sequence symbols, such as a Zadoff-Chu sequence/sequences; or, the first indication information transmitted by the network device and/or the second indication information transmitted by the terminal equipment may be indication signaling needing to be modulated or encoded, and the embodiment of this disclosure is not limited thereto.

As shown in FIG. 7, the method may further include:

step 705: the terminal equipment transmits uplink information without performing channel detection.

It should be noted that FIG. 7 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 7.

In an embodiment, when the terminal equipment receives third indication information of the network device instructing the terminal equipment to transmit uplink transmission of the first channel access type without performing channel detection and the uplink transmission of the first channel access type not performing channel detection is scheduled to be transmitted out of a valid time of the second indication information, the terminal equipment determines that the third indication information is wrong information.

In an embodiment, the terminal equipment does not expect that the uplink transmission of the first channel access type without performing channel detection is scheduled to be transmitted outside the valid time of the second indication information; or, when the second indication information indicating that the channel is idle is not transmitted, the terminal equipment does not expect that the network device instructs the terminal equipment to transmit the uplink transmission of the first channel access type without performing channel detection.

In an embodiment, when second indication information indicating that the channel is idle is not transmitted and the terminal equipment receives third indication information of the network device instructing the terminal equipment to perform uplink transmission of the first channel access type without performing channel detection, the terminal equipment determines that the third indication information is wrong information.

For example, in order to prevent the hidden node of the base station around the UE from causing degradation of transmission quality, the base station needs to determine whether a channel around the UE is in an idle state before scheduling the UE to transmit uplink transmission without performing channel detection. Therefore, the base station first transmits channel detection indication information to the UE, and only after the base station receives the indication information that a channel around is idle transmitted by the UE, can it schedule the UE to transmit the uplink transmission without performing channel detection; or, after the base station receives the indication information indicating that a channel around is idle transmitted by the UE, it schedules the UE to transmit the uplink transmission without performing channel detection within an effective time of the indication information indicating that a channel around is idle. When the UE does not transmit indication information indicating that a channel around is idle and receives the uplink transmission without performing channel detection scheduled by the base station, the UE deems that a scheduling error occurs. Or, if an uplink transmission without performing channel detection is scheduled outside the effective time of the channel idle indication information, the UE deems that a scheduling error occurs.

It should be noted that the above embodiment s only illustrate the disclosure. However, this disclosure is not limited thereto, and appropriate variants may be made on the basis of these embodiments. For example, the above embodiments may be executed separately, or one or more of them may be executed in a combined manner.

It can be seen from the above embodiments that the terminal equipment determines that there exists a hidden node of the network equipment around, and takes such a situation as a condition for whether to use the channel access type without performing channel detection. Hence, interference resulted from the hidden node when no channel detection is performed may be avoided or lowered, thereby improving reliability of transmission Embodiment 3

The embodiments of this disclosure provide a method for transmitting uplink control information, which may be carried out separately, or may be carried out in conjunction with Embodiment 1, or may be carried out in conjunction with Embodiment 2, or may be carried out in conjunction with embodiments 1 and 2.

Figure 8:
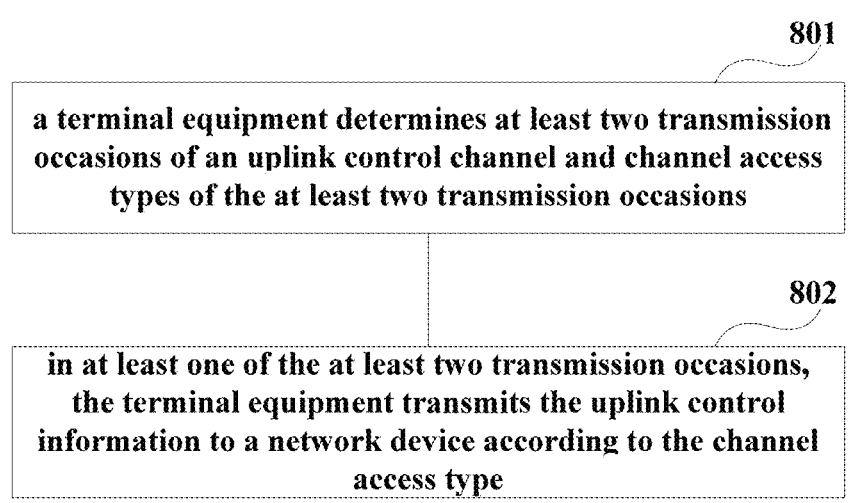
FIG. 8 is a schematic diagram of the method for transmitting uplink control information of an embodiment of this disclosure.

FIG. 8 is a schematic diagram of the method for transmitting uplink control information of the embodiment of this disclosure. As shown in FIG. 8, the method includes:
- step 801: a terminal equipment determines at least two transmission occasions of an uplink control channel and channel access types of the at least two transmission occasions; and
- step 802: in at least one of the at least two transmission occasions, the terminal equipment transmits the uplink control information to a network device according to the channel access type.

In an embodiment, the transmission occasions are time-frequency resources of an uplink control channel having different frequency domain positions or different time domain positions and used for transmitting the uplink control information. In communication of an unlicensed spectrum, when a channel is detected as being busy, a transmitting device is unable to transmit a signal, and as UCI is relatively important to ensuing uplink and downlink communication, multiple transmission occasions may be provided for a PUCCH, the multiple transmission occasions being multiple PUCCH resources having different frequency domain positions or different time domain positions.

In an embodiment, the terminal equipment determines a channel access type of a first transmission occasion in the at least two transmission occasions according to an indication of the network device.

For example, a UE may determine a channel access type in one of the configuration, indication or default manners described in Embodiment 1, and the multiple transmission occasions performs channel access by using the channel access type. And the UE may adjust channel access types of the transmission occasions in a predefined manner.

In an embodiment, the terminal equipment may determine a channel access type of a second transmission occasion other than the first transmission occasion in the at least two transmission occasions according to at least one of the following: a channel detection condition of a transmission occasion preceding the second transmission occasion; whether the second transmission occasion is within a channel occupation time of the network device.

For example, the UE determines the channel access type used for the first transmission occasion according to a method in Embodiment 1. After the channel of one transmission occasion is detected as being busy and the transmission fails, a channel access type of a next time of transmission occasion is adjusted in a predefined channel manner.

For example, the base station configures the channel access type for the first transmission occasion for the UE to be the second channel access type with a detection interval of 25 us. If the UE detects before the first transmission occasion that the channel is busy and is able to transmit the PUCCH at the first transmission occasion, the UE will use the third channel access type having a highest priority (a counter with a minimal initial value) including the detection interval and contention window before the second transmission occasion. If it fails again, the UE increases the initial value of the detection window counter in a predefined manner at the next time of transmission occasion to perform channel detection. Alternatively, the predefined channel access type adjustment manner is using the configured or indicated or default channel access type for former two transmission occasions, and the counter size of the detection window is adjusted next time.

For another example, the UE adjusts the channel access type in a predefined manner according to whether the transmission occasion is within the channel occupation time of the base station. It may be predefined that when the transmission occasion of the PUCCH is within the channel occupation time of the base station, a predefined channel access type is adopted, and the transmission occasion out of the channel occupation time of the base station adopts another channel access type that is configured or indicated by the base station or is predefined. For example, it is specified in standards that when the transmission occasion of the PUCCH is within the channel occupation time of the base station, the second channel access type with a detection interval of 25 us is adopted, and if it is out of the channel occupation time of the base station, the third channel access type configured by the base station for it is adopted.

Or, the base station configures or indicates a channel access type for the UE. If the first transmission occasion of the PUCCH is within the channel occupation time of the base station, the channel access types configured or indicated by the base station are adopted in the transmission occasions within the channel occupation time, and channel access types are adjusted in a predefined manner for the transmission occasions out of the channel occupation time of the base station. And if the first transmission occasion of the PUCCH is out of the channel occupation time of the base station, the UE performs channel detection before the transmission occasions by using the channel access type configured or indicted by the base station.

For another example, the base station contains a channel access type indicator field in the DCI, a value of the field indicating an index value, an index value corresponding to a group of channel access types, and the group of channel access types corresponding to multiple transmission occasions one to one; and the UE performs channel detection by using a channel access type corresponding to it before the transmission occasions. A correspondence between index values and channel access types may be configured by a higher layer, or may be a predefined table.

In an embodiment, the channel access type is independently configured or defined for the at least two transmission occasions respectively. For example, the base station configures channel access types respectively for PUCCH resources of multiple transmission occasions, and the UE performs channel detection by using a channel access type corresponding to it before the transmission occasions.

In an embodiment, the at least two transmission occasions are allocated on unit bandwidths having different frequency domains and used for channel detection.

For example, as an SR or CSI is configured with periodic or semi-persistent resources by the higher layer, multiple transmission occasions for the SR or CSI may be achieved by reducing period values. The multiple transmission occasions may be allocated on channel detection unit bandwidths of different frequency domains. For example, a unit bandwidth of channel detection is 20 MHz, and the base station configures an integer number of PUCCH resources for the SR or CSI, wherein at least two PUCCH resources are allocated on different unit bandwidths of channel detection, and a location of a frequency band may be determined according to the parameter 'startingPRB' in the 'PUCCH-Resource' configuration.

For example, the channel access types may be added into the SR or CSI configuration. This method is applicable to the configured PUCCHs, and the UE performs channel detection according to the channel access types before the configured PUCCH resources, and carries the PUCCH of the SR or CSI on the PUCCH resource detected as being idle.

Table 10 exemplarily shows a situation of configuration of the PUCCH resources of the SR.

TABLE 10

```
SchedulingRequestResourceConfig ::=     SEQUENCE {
    schedulingRequestResourceId          SchedulingRequestResourceId,
    schedulingRequestID                  SchedulingRequestId,
            ------------A part of the contents are omitted------------
    channelaccesstypeSR                  CHOICE {type1, type2, ..., typeX}
    resource         SEQUENCE (SIZE (1..maxNrofSRopportunities)) OF PUCCH-ResourceId
                 OPTIONAL   -- Need M
}
```

Table 11 exemplarily shows a situation of configuration of the PUCCH resources of the CSI.

TABLE 11

```
PUCCH-CSI-Resource ::=      SEQUENCE {
    uplinkBandwidthPartId         BWP-Id,
    channelaccesstypeCSI           CHOICE {type1, type2, ..., typeX}
    pucch-Resource   SEQUENCE (SIZE (1..maxNrofCSIopportunities)) OF PUCCH-ResourceId
}
```

For another example, a channel access type is not configured in the SR or CSI configuration, that is, the parameter 'channelaccesstypeSR' or 'channelaccesstypeCSI' is not contained in the above example, but channel access type is configured in 'PUCCH-Resource' or 'PUCCH formatX'. Before an integer number of PUCCH resources in the SR or CSI configuration, channel detection is performed according to the channel access types configured for the resources, and the PUCCH is transmitted on the PUCCH resource where the channel is detected as being idle.

For a further example, time information of multiple pieces of HARQ feedback may be indicated by the 'PDSCH-to-HARQ_feedback timing indicator' field in the DCI, so as to obtain PUCCH transmission occasions of multiple times of HARQ feedback. Alternatively, a group of PUCCH resources may be indicated by the 'PDSCH-to-HARQ_feedback timing indicator' field in the DCI, so as to obtain multiple resources for transmitting HARQ feedback.

Moreover, above tables 10-11 only illustrate the embodiment of this disclosure. However, this disclosure is not limited thereto, and appropriate variants may be made on the basis of the contents of tables 10-11, and such variants are all within the coverage of the embodiment of this disclosure.

It can be seen from the above embodiments that the terminal equipment transmits the uplink control information to the network device and in at least one of the at least two transmission occasions according to the channel access type. Hence, transmission latency may be reduced and transmission efficiency may be improved.

Embodiment 4

The embodiments of this disclosure provide a method for receiving uplink control information, which shall be described from a network device (i.e. a side where uplink control information is received) side, with contents identical to those in embodiments 1-3 being not going to be described herein any further.

Figure 9:
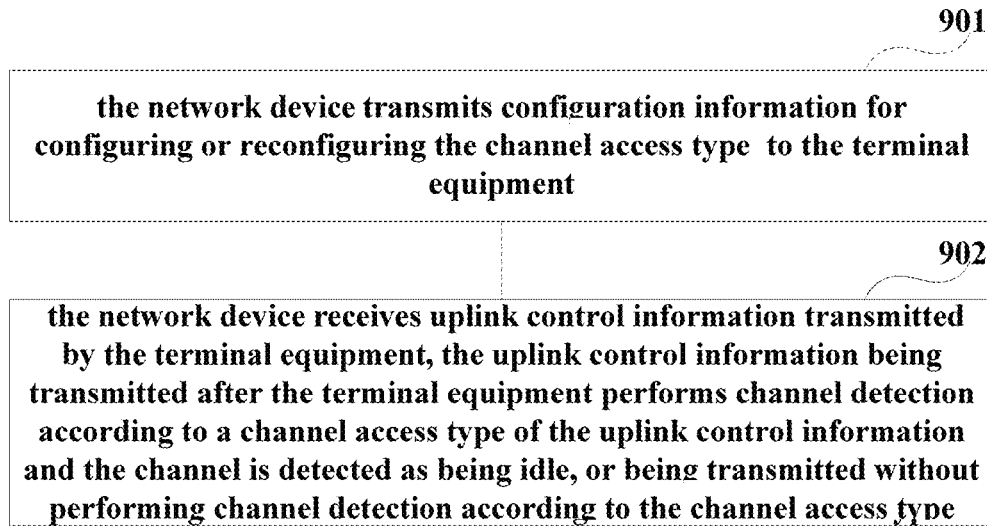
FIG. 9 is a schematic diagram of the method for receiving uplink control information of an embodiment of this disclosure.

FIG. 9 is a schematic diagram of the method for receiving uplink control information of the embodiment of this disclosure. As shown in FIG. 9, the method includes:

step 902: a network device receives uplink control information transmitted by a terminal equipment, the uplink control information being transmitted after the terminal equipment performs channel detection according to a channel access type of the uplink control channel and the channel is detected as being idle, or being transmitted without performing channel detection according to the channel access type.

In an embodiment, the channel access type includes at least one of the following: a first channel access type not performing channel detection, a second channel access type containing a detection interval, a third channel access type containing a detection interval and a contention window.

In an embodiment, the uplink control information is transmitted by using an unlicensed spectrum.

As shown in FIG. 9, the method may further include:

step 901: the network device transmits configuration information for configuring or reconfiguring the channel access type to the terminal equipment.

In an embodiment, the configuration information is transmitted via a system message and/or RRC signaling.

It should be noted that FIG. 9 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 9.

In an embodiment, the channel access type is configured via UE-specific physical uplink control channel configuration signaling; or, the channel access type is configured via the system message; or, the channel access type is configured via the system message, and is reconfigured via the UE-specific physical uplink control channel configuration signaling.

In an embodiment, the channel access type is configured or reconfigured for at least one physical uplink control channel resource via radio resource control signaling.

In an embodiment, at least two physical uplink control channel resources are independently configured with channel access types respectively, or formats of at least two physical uplink control channel resources are independently configured with the channels access types respectively.

In an embodiment, the channel access type is determined at least according to the format and/or duration of the physical uplink control channel resource.

In an embodiment, a channel access type adopted by an uplink control channel carrying the uplink control information is configured or reconfigured via radio resource control signaling for the for at least one type of uplink control information (UCI), the uplink control information (UCI) including at least one or more of the following types: hybrid automatic repeat request (HARQ) feedback information, channel state information, scheduling request.

In an embodiment, at least two types of uplink control information are independently configured with the channel access types respectively.

In an embodiment, at least two channel access types are configured via radio resource control signaling, and one of the at least two channel access types is activated by a medium access control (MAC) control element (CE).

In an embodiment, the configuration information is transmitted via downlink control information (DCI).

In an embodiment, the downlink control information indicates the channel access type of the hybrid automatic repeat request (HARQ) feedback information.

In an embodiment, the channel access type is predefined.

It should be noted that the above embodiments only illustrate the disclosure. However, this disclosure is not limited thereto, and appropriate variants may be made on the basis of these embodiments. For example, the above embodiments may be executed separately, or one or more of them may be executed in a combined manner.

It can be seen from the above embodiments that the terminal equipment performs channel detection according to the channel access type and transmits the uplink control information to the network device after it is detected that the channel is idle, or the terminal equipment performs no channel detection according to the channel access type and transmits the uplink control information to the network device. Hence, in some scenarios, uplink control information may be transmitted without detecting a channel, which may lower latency and improve transmission efficiency; and in some other scenarios, uplink control information may be transmitted after the channel is detected as being idle, which may avoid or lower interference and improve reliability of transmission.

Embodiment 5

The embodiments of this disclosure provide an apparatus for transmitting uplink control information. The apparatus may be, for example, a terminal equipment, or may be one or more components or assemblies configured in a terminal equipment. Contents in the embodiments identical to those in embodiments 1-4 shall not be described herein any further.

Figure 10:
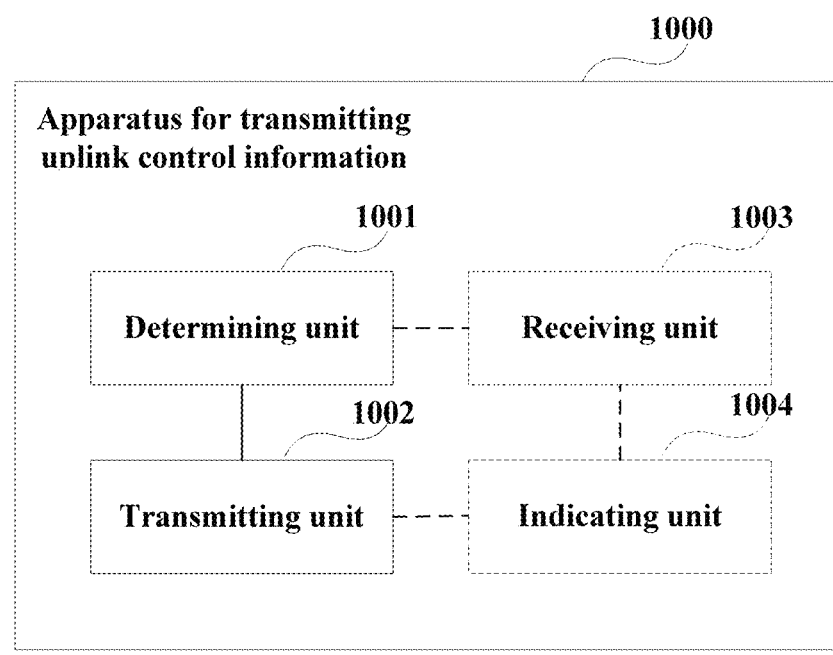
FIG. 10 is a schematic diagram of the apparatus for transmitting uplink control information of an embodiment of this disclosure.

FIG. 10 is a schematic diagram of the apparatus for transmitting uplink control information of the embodiment of this disclosure. As shown in FIG. 10, an apparatus 1000 for transmitting uplink control information includes:

a determining unit 1001 configured to determine a channel access type of an uplink control channel used for transmitting uplink control information, the channel access type including at least one of the following: a first channel access type not performing channel detection, a second channel access type containing a detection interval, a third channel access type containing a detection interval and a contention window; and a transmitting unit 1002 configured to detect a channel according to the channel access type and transmit the uplink control information to a network device after the channel is detected as being idle, or not to detect a channel according to the channel access type and transmit the uplink control information to the network device.

As shown in FIG. 10, the apparatus 1000 may further include:

a receiving unit 1003 configured to receive configuration information used for configuring or reconfiguring the channel access type transmitted by the network device.

In an embodiment, the configuration information is transmitted via a system message and/or radio resource control signaling; wherein the channel access type is configured via terminal equipment-specific physical uplink control channel configuration signaling, or the channel access type is configured via the system message, or the channel access type is configured via the system message and the channel access type is reconfigured via the terminal equipment-specific physical uplink control channel configuration signaling.

In an embodiment, the channel access type is configured or reconfigured for at least one physical uplink control channel resource via radio resource control signaling; wherein at least two physical uplink control channel resources are independently configured with the channel access type respectively, or formats of at least two physical uplink control channel resources are independently configured with the channel access type respectively.

In an embodiment, the channel access type is determined at least according to a format and/or a duration of the physical uplink control channel resource.

In an embodiment, the channel access type adopted by an uplink control channel carrying the uplink control information is configured or reconfigured for at least one kind of uplink control information via radio resource control signaling, the uplink control information including at least one or more of the following: hybrid automatic repeat request (HARQ) feedback information, channel state information, and a scheduling request; wherein at least two kinds of the uplink control information are independently configured with the channel access type respectively.

In an embodiment, at least two kinds of the channel access type are configured via radio resource control signaling, and one of the at least two kinds of the channel access type is activated via a media access control control element.

In an embodiment, the configuration information is transmitted via downlink control information, the downlink control information indicating a channel access type of hybrid automatic repeat request feedback information.

In an embodiment, the channel access type is predefined.

In an embodiment, the determining unit 1001 is further configured to determine that there exists a hidden node of a network device around, and the apparatus 1000 may further include: an indicating unit 1004 configured to indicate that there exists the hidden node of a network device around to the network device.

In an embodiment, the hidden node of the network device is one or more transmission devices; and when the transmission device(s) transmit(s) signals, the network device is unable to detect that a channel is occupied by the transmission device(s), and the terminal equipment is able to detect that a channel is occupied by the transmission device(s).

In an embodiment, the determining unit 1001 may further be configured to determine not to transmit uplink control information by using a first channel access type not performing channel detection, or not to expect that the network device schedules uplink transmission of the first channel access type not performing channel detection.

In an embodiment, the transmitting unit 1002 may further be configured to transmit indication information indicating that the channel is idle to the network device.

In an embodiment, the determining unit 1001 may further be configured to determine at least two transmission occasions of the uplink control channel and channel access type of the at least two transmission occasions; and the transmitting unit 1002 may further be configured to, in at least one of the at least two transmission occasions, transmit the uplink control information to the network device according to the channel access type.

In an embodiment, the determining unit 1001 may further be configured to determine a channel access type of a first transmission occasion in the at least two transmission occasions according to an indication of the network device, and determine a channel access type of a second transmission occasion other than the first transmission occasion in the at least two transmission occasions according to at least one of the following: a channel detection condition of a transmission occasion preceding the second transmission occasion, and whether the second transmission occasion is within a channel occupation time of the network device.

In an embodiment, the channel access type is independently configured or defined for the at least two transmission occasions respectively, and/or the at least two transmission occasions are allocated on unit bandwidths having different frequency domains and used for channel detection.

It should be noted that the components or modules related to this disclosure are only described above. However, this disclosure is not limited thereto, and the apparatus 1000 for transmitting uplink control information may further include other components or modules, and reference may be made to related techniques for particulars of these components or modules.

Furthermore, for the sake of simplicity, connection relationships between the components or modules or signal profiles thereof are only illustrated in FIG. 10. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the terminal equipment performs channel detection according to the channel access type and transmits the uplink control information to the network device after it is detected that the channel is idle, or the terminal equipment performs no channel detection according to the channel access type and transmits the uplink control information to the network device. Hence, in some scenarios, uplink control information may be transmitted without detecting a channel, which may lower latency and improve transmission efficiency; and in some other scenarios, uplink control information may be transmitted after the channel is detected as being idle, which may avoid or lower interference and improve reliability of transmission.

Embodiment 6

The embodiments of this disclosure provide an apparatus for receiving uplink control information. The apparatus may be, for example, a network device, or may be one or more components or assemblies configured in a r network device. Contents in the embodiments identical to those in embodiments 1-4 shall not be described herein any further.

Figure 11:
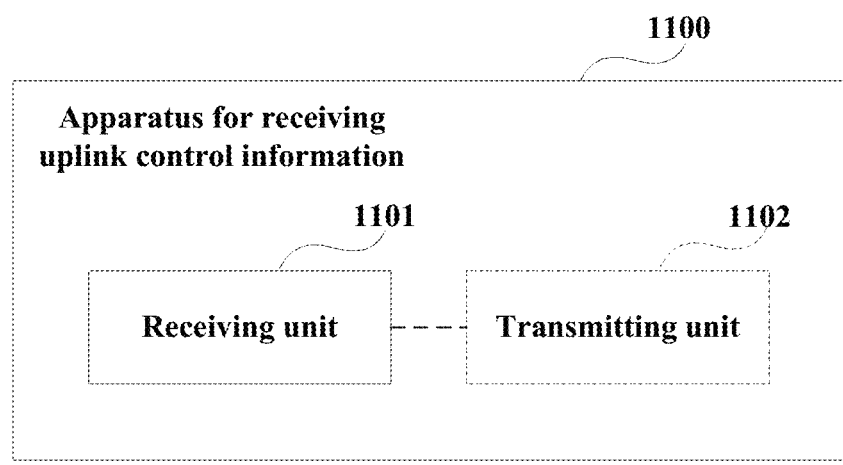
FIG. 11 is a schematic diagram of the apparatus for receiving uplink control information of an embodiment of this disclosure.

FIG. 11 is a schematic diagram of the apparatus for receiving uplink control information of the embodiment of this disclosure. As shown in FIG. 11, an apparatus 1100 for receiving uplink control information includes:

a receiving unit 1101 configured to receive uplink control information transmitted by a terminal equipment, the uplink control information being transmitted after the terminal equipment performs channel detection according to a channel access type of the uplink control channel and the channel is detected as being idle, or being transmitted without performing channel detection according to the channel access type;

the channel access type including at least one of the following: a first channel access type not performing channel detection, a second channel access type containing a detection interval, a third channel access type containing a detection interval and a contention window.

As shown in FIG. 11, the apparatus 1100 may further include:

a transmitting unit 1102 configured configuration information for configuring or reconfiguring the channel access type to the terminal equipment.

It should be noted that the components or modules related to this disclosure are only described above. However, this disclosure is not limited thereto, and the apparatus 1100 for receiving uplink control information may further include other components or modules, and reference may be made to related techniques for particulars of these components or modules.

Furthermore, for the sake of simplicity, connection relationships between the components or modules or signal profiles thereof are only illustrated in FIG. 10. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the terminal equipment performs channel detection according to the channel access type and transmits the uplink control information to the network device after it is detected that the channel is idle, or the terminal equipment performs no channel detection according to the channel access type and transmits the uplink control information to the network device. Hence, in some scenarios, uplink control information may be transmitted without detecting a channel, which may lower latency and improve transmission efficiency; and in some other scenarios, uplink control information may be transmitted after the channel is detected as being idle, which may avoid or lower interference and improve reliability of transmission.

Embodiment 7

The embodiments of this disclosure provide a communication system, and reference may be made to FIG. 1, with contents identical to those in embodiments 1-6 being not going to be described herein any further. In an embodiment, the communication system 100 may include:
- a terminal equipment 102 configured to determine a channel access type of an uplink control channel used for transmitting uplink control information, and detect a channel according to the channel access type and transmit the uplink control information to a network device after the channel is detected as being idle, or not to detect a channel according to the channel access type and transmit the uplink control information to the network device; and
- a network device 101 configured to receive uplink control information transmitted by the terminal equipment; wherein the channel access type includes at least one of the following: a first channel access type not performing channel detection, a second channel access type containing a detection interval, a third channel access type containing a detection interval and a contention window.

The embodiment of this disclosure further provides a network device, which may be, for example, a base station. However, this disclosure is not limited thereto, and it may also be another network device.

Figure 12:
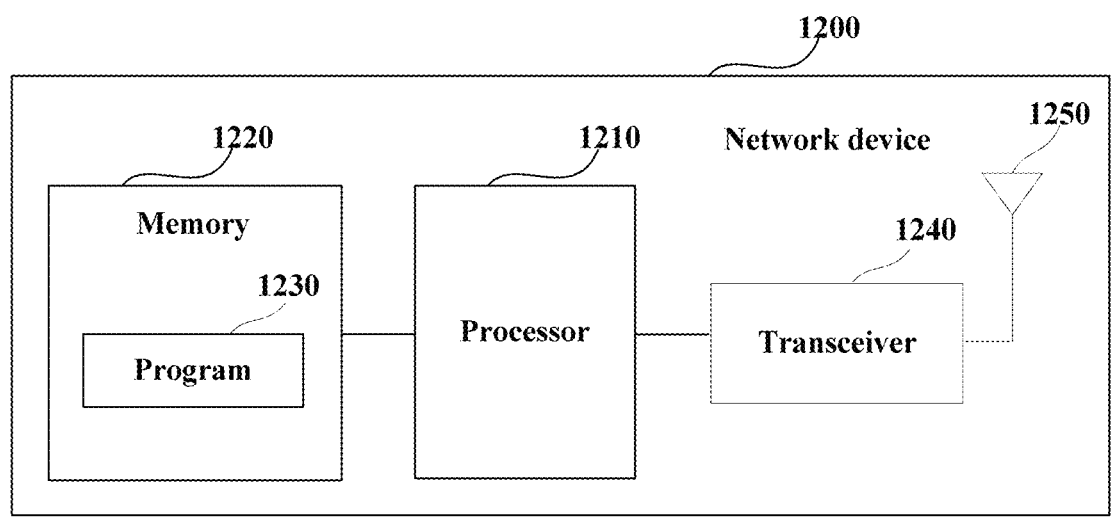
FIG. 12 is a schematic diagram of the network device of an embodiment of this disclosure.

FIG. 12 is a schematic diagram of a structure of the network device of the embodiment of this disclosure. As shown in FIG. 12, a network device 1200 may include a processor 1210 (such as a central processing unit (CPU)) and a memory 1220, the memory 1220 being coupled to the processor 1210. The memory 1220 may store various data, and furthermore, it may store a program 1230 for data processing, and execute the program 1230 under control of the processor 1210.

For example, the processor 1210 may be configured to execute the program to carry out the method for receiving uplink control information as described in Embodiment 4. For example, the processor 1210 may be configured to perform the following control: receiving uplink control information transmitted by a terminal equipment, the uplink control information being transmitted after the terminal equipment performs channel detection according to a channel access type of the uplink control channel and the channel is detected as being idle, or being transmitted without performing channel detection according to the channel access type.

Furthermore, as shown in FIG. 12, the network device 1200 may include a transceiver 1240, and an antenna 1250, etc. Functions of the above components are similar to those in the relevant art, and shall not be described herein any further. It should be noted that the network device 1200 does not necessarily include all the parts shown in FIG. 12, and furthermore, the network device 1200 may include parts not shown in FIG. 12, and the relevant art may be referred to.

The embodiment of this disclosure further provides a terminal equipment, however, this disclosure is not limited thereto, and it may also be another equipment.

Figure 13:
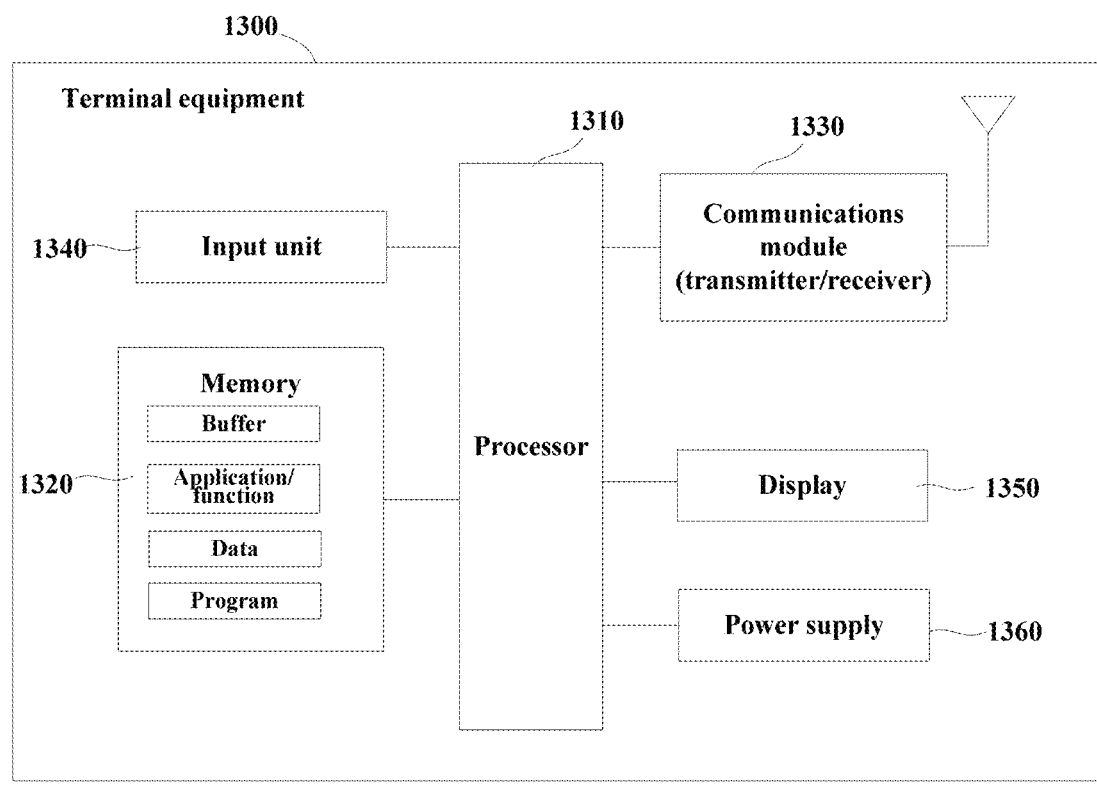
FIG. 13 is a schematic diagram of the terminal equipment of an embodiment of this disclosure.

FIG. 13 is a schematic diagram of the terminal equipment of the embodiment of this disclosure. As shown in FIG. 13, a terminal equipment 1300 may include a processor 1310 and a memory 1320, the memory 1320 storing data and a program and being coupled to the processor 1310. It should be noted that this figure is illustrative only, and other types of structures may also be used, so as to supplement or replace this structure and achieve a telecommunications function or other functions.

For example, the processor 1310 may be configured to execute a program to carry out the method for transmitting uplink control information as described in Embodiment 1 and/or Embodiment 3 and/or the information indication method as described in Embodiment 2. For example, the processor 1310 may be configured to perform the following control: determining a channel access type of an uplink control channel used for transmitting uplink control information, the channel access type including at least one of the following: a first channel access type not performing channel detection, a second channel access type containing a detection interval, a third channel access type containing a detection interval and a contention window; and detecting a channel according to the channel access type and transmitting the uplink control information to a network device after the channel is detected as being idle, or not detecting a channel according to the channel access type and transmitting the uplink control information to the network device.

As shown in FIG. 13, the terminal equipment 1300 may further include a communication module 1330, an input unit 1340, a display 1350, and a power supply 1360; wherein functions of the above components are similar to those in the relevant art, which shall not be described herein any further. It should be noted that the terminal equipment 1300 does not necessarily include all the parts shown in FIG. 13, and the above components are not necessary. Furthermore, the terminal equipment 1300 may include parts not shown in FIG. 13, and the relevant art may be referred to.

An embodiment of the present disclosure provides a computer program, which, when executed in a terminal equipment, will cause the terminal equipment to carry out the method for transmitting uplink control information described in Embodiment 1 or Embodiment 3 or the information indication method described in Embodiment 2.

An embodiment of this disclosure provides a storage medium, including a computer program, which will cause a terminal equipment to carry out the method for transmitting uplink control information described in Embodiment 1 or Embodiment 3 or the information indication method described in Embodiment 2.

An embodiment of the present disclosure provides a computer program, which, when executed in a network device, will cause the network device to carry out the method for receiving uplink control information described in Embodiment 2.

An embodiment of this disclosure provides a storage medium, including a computer program, which will cause a network device to carry out the method for receiving uplink control information described in Embodiment 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

Supplement 1. A method for transmitting uplink control information, including:
determining, by a terminal equipment, a channel access type of an uplink control channel used for transmitting uplink control information, the channel access type including at least one of the following: a first channel access type not performing channel detection, a second channel access type containing a detection interval, and a third channel access type containing a detection interval and a contention window; and
detecting a channel by the terminal equipment according to the channel access type and transmitting the uplink control information to a network device after the channel is detected as being idle, or not detecting a channel according to the channel access type and transmitting the uplink control information to the network device.

Supplement 2. The method according to supplement 1, wherein the uplink control information is transmitted by using an unlicensed spectrum.

Supplement 3. The method according to supplement 1 or 2, wherein the method further includes:
receiving, by the terminal equipment, configuration information used for configuring or reconfiguring the channel access types transmitted by the network device.

Supplement 4. The method according to supplement 3, wherein the configuration information is transmitted via a system message and/or radio resource control (RRC) signaling.

Supplement 5. The method according to supplement 3 or 4, wherein the channel access type is configured via UE-specific PUCCH configuration signaling; or
the channel access type is configured via the system message; or
the channel access type is configured via the system message, and the channel access type is reconfigured via the UE-specific PUCCH configuration signaling.

Supplement 6. The method according to supplement 3 or 4, wherein the channel access type is configured or reconfigured for at least one PUCCH resource via RRC signaling.

Supplement 7. The method according to supplement 6, wherein the at least two PUCCH resources are independently configured with the channel access type respectively, or formats of the at least two PUCCH resources are independently configured with the channel access type separately.

Supplement 8. The method according to supplement 6 or 7, wherein the channel access type is determined at least according to a format and/or a duration of the physical uplink control channel resource.

Supplement 9. The method according to supplement 3 or 4, wherein the channel access type is configured or reconfigured for at least one kind of uplink control information via radio resource control signaling, the uplink control information including at least one or more of the following: hybrid automatic repeat request (HARM) feedback information, channel state information, and a scheduling request.

Supplement 10. The method according to supplement 9, wherein at least two kinds of the uplink control information are independently configured with the channel access type respectively.

Supplement 11. The method according to supplement 3 or 4, wherein at least two of the channel access types are configured via RRC signaling, and one of the at least two channel access types is activated via a medium access control (MAC) control element (CE).

Supplement 12. The method according to supplement 3, wherein the configuration information is transmitted via downlink control information (DCI).

Supplement 13. The method according to supplement 12, wherein the downlink control information indicates a channel access type of the hybrid automatic repeat request (HARD) feedback information.

Supplement 14. The method according to supplement 1 or 2, wherein the channel access type is predefined.

Supplement 15. The method according to any one of supplements 1-14, wherein the method further includes:
determining that there exists a hidden node of a network device around by the terminal equipment; and indicating that there exists the hidden node of the network device around by the terminal equipment to the network device.

Supplement 16. The method according to supplement 15, wherein the hidden node of the network device is one or more transmission devices;

and when the transmission device(s) transmit(s) signals, the network device is unable to detect that a channel is occupied by the transmission device(s), and the terminal equipment is able to detect that a channel is occupied by the transmission device(s).

Supplement 17. The method according to supplement 15 or 16, wherein the method further includes:

determining by the terminal equipment not to perform transmission of the uplink control information by using the first channel access type without performing channel detection.

Supplement 18. The method according to any one of supplements 15-17, wherein the method further includes:

not expecting by the terminal equipment that the network device schedule uplink transmission of the first channel access type without performing channel detection.

Supplement 19. The method according to any one of supplements 15-18, wherein the method further includes:

when there exists a hidden node of the network device around and third indication information of the network device instructing the terminal equipment to transmit uplink transmission of the first channel access type without performing channel detection is received, determining by the terminal equipment that the third indication information is wrong information.

Supplement 20. The method according to any one of supplements 15-18, wherein the method further includes:

receiving by the terminal equipment first indication information used for instructing the terminal equipment to detect a channel and transmitted by the network device; and when the channel is detected as being idle, transmitting second indication information indicating that the channel is idle by the terminal equipment to the network device.

Supplement 21. The method according to supplement 20, wherein the method further includes:

when the terminal equipment receives the third indication information of the network device instructing the terminal equipment to transmit uplink transmission of the first channel access type without performing channel detection and the uplink transmission of the first channel access type not performing channel detection is scheduled to be transmitted out of a valid time of the second indication information, determining by the terminal equipment that the third indication information is wrong information.

Supplement 22. The method according to supplement 20, wherein the method further includes:

not expecting by the terminal equipment that the uplink transmission of the first channel access type not performing channel detection is scheduled to be transmitted out of the valid time of the second indication information.

Supplement 23. The method according to any one of supplements 15-18, wherein the method further includes:

when no indication information indicating that a channel is idle is transmitted, not expecting by the terminal equipment that the network device schedules the uplink transmission of the first channel access type not performing channel detection.

Supplement 24. The method according to any one of supplements 15-18, wherein the method further includes:

when second indication information indicating that the channel is idle is not transmitted and the terminal equipment receives third indication information of the network device instructing the terminal equipment to perform uplink transmission of the first channel access type not performing channel detection, determining by the terminal equipment that the third indication information is wrong information.

Supplement 25. The method according to any one of supplements 1-24, wherein the method further includes:

determining at least two transmission occasions of the uplink control channel and channel access types of the at least two transmission occasions by the terminal equipment; and in at least one of the at least two transmission occasions, transmitting the uplink control information to the network device according to the channel access type.

Supplement 26. The method according to supplement 25, wherein the transmission occasions are time-frequency resources having different frequency domain positions or different time domain positions and used for transmitting the uplink control information.

Supplement 27. The method according to supplement 25 or 26, wherein the terminal equipment determines a channel access type of a first transmission occasion in the at least two transmission occasions according to an indication of the network device.

Supplement 28. The method according to supplement 27, wherein the terminal equipment determines a channel access type of a second transmission occasion other than the first transmission occasion in the at least two transmission occasions according to at least one of the following:

a channel detection condition of a transmission occasion preceding the second transmission occasion; and whether the second transmission occasion is within a channel occupation time of the network device.

Supplement 29. The method according to any one of supplements 25-28, wherein the channel access type is independently configured or defined for the at least two transmission occasions respectively.

Supplement 30. The method according to any one of supplements 25-29, wherein the at least two transmission occasions are allocated on unit bandwidths having different frequency domains and used for channel detection.

Supplement 31. A method for receiving uplink control information, including:

receiving, by a network device, uplink control information transmitted by a terminal equipment, the uplink control information being transmitted after the terminal equipment performs channel detection according to a channel access type of the uplink control channel and the channel is detected as being idle, or being transmitted without performing channel detection according to the channel access type, the channel access type including at least one of the following: a first channel access type not performing channel detection, a second channel access type containing a detection interval, and a third channel access type containing a detection interval and a contention window.

Supplement 32. The method according to supplement 31, wherein the uplink control information is transmitted by using an unlicensed spectrum.

Supplement 33. The method according to supplement 31 or 32, wherein the method further includes:

transmitting configuration information used for configuring or reconfiguring the channel access types by the network device to the terminal equipment.

Supplement 34. The method according to supplement 33, wherein the configuration information is transmitted via a system message and/or radio resource control (RRC) signaling.

Supplement 35. The method according to supplement 33 or 34, wherein the channel access type is configured via UE-specific PUCCH configuration signaling; or
the channel access type is configured via the system message; or
the channel access type is configured via the system message, and the channel access type is reconfigured via the UE-specific PUCCH configuration signaling.

Supplement 36. The method according to supplement 33 or 34, wherein the channel access type is configured or reconfigured for at least one PUCCH resource via RRC signaling.

Supplement 37. The method according to supplement 36, wherein the at least two PUCCH resources are independently configured with the channel access type respectively, or formats of the at least two PUCCH resources are independently configured with the channel access type separately.

Supplement 38. The method according to supplement 36 or 37, wherein the channel access type is determined at least according to a format and/or a duration of the physical uplink control channel resource.

Supplement 39. The method according to supplement 33 or 34, wherein the channel access type is configured or reconfigured for at least one kind of uplink control information via radio resource control signaling, the uplink control information including at least one or more of the following: hybrid automatic repeat request (HARD) feedback information, channel state information, and a scheduling request.

Supplement 40. The method according to supplement 39, wherein at least two kinds of the uplink control information are independently configured with the channel access type respectively.

Supplement 41. The method according to supplement 33 or 34, wherein at least two of the channel access types are configured via RRC signaling, and one of the at least two channel access types is activated via a medium access control (MAC) control element (CE).

Supplement 42. The method according to supplement 33, wherein the configuration information is transmitted via downlink control information (DCI).

Supplement 43. The method according to supplement 42, wherein the downlink control information indicates a channel access type of the hybrid automatic repeat request (HARQ) feedback information.

Supplement 44. The method according to supplement 31 or 32, wherein the channel access type is predefined.

Supplement 45. An information indication method, including:
determining that there exists a hidden node of a network device around by a terminal equipment; and
indicating that there exists the hidden node of a network device around by the terminal equipment to the network device.

Supplement 46. The method according to supplement 45, wherein the hidden node of the network device is one or more transmission devices;
and when the transmission device(s) transmit(s) signals, the network device is unable to detect that a channel is occupied by the transmission device(s), and the terminal equipment is able to detect that a channel is occupied by the transmission device(s).

Supplement 47. The method according to supplement 45 or 46, wherein the method further includes:
determining by the terminal equipment that uplink control information is not transmitted by using a first channel access type not performing channel detection.

Supplement 48. The method according to any one of supplements 45-47, wherein the method further includes:
not expecting by the terminal equipment that the network device schedules uplink transmission of the first channel access type not performing channel detection.

Supplement 49. The method according to any one of supplements 45-48, wherein the method further includes:
determining by the terminal equipment that third indication information is wrong information, when there exists a hidden node of the network device around and the third indication information of the network device is received, the third information instructing the terminal equipment to perform uplink transmission of the first channel access type not performing channel detection.

Supplement 50. The method according to any one of supplements 45-48, wherein the method further includes:
receiving by the terminal equipment first indication information used for instructing the terminal equipment to detect a channel and transmitted by the network device; and
when the channel is detected as being idle, transmitting second indication information indicating that the channel is idle by the terminal equipment to the network device.

Supplement 51. The method according to supplement 50, wherein the method further includes:
when the terminal equipment receives the third indication information of the network device instructing the terminal equipment to transmit uplink transmission of the first channel access type not performing channel detection and the uplink transmission of the first channel access type not performing channel detection is scheduled to be transmitted out of a valid time of the second indication information, determining by the terminal equipment that the third indication information is wrong information.

Supplement 52. The method according to supplement 50, wherein the method further includes:
not expecting by the terminal equipment that the uplink transmission of the first channel access type not performing channel detection is scheduled to be transmitted out of the valid time of the second indication information.

Supplement 53. The method according to any one of supplements 45-48, wherein the method further includes:
when the second indication information indicating that the channel is idle is not transmitted, not expecting by the terminal equipment that the network device schedules uplink transmission of the first channel access type not performing channel detection.

Supplement 54. The method according to any one of supplements 45-48, wherein the method further includes:
when second indication information indicating that the channel is idle is not transmitted and the terminal equipment receives third indication information of the network device instructing the terminal equipment to perform uplink transmission of the first channel access type not performing channel detection, determining by the terminal equipment that the third indication information is wrong information.

Supplement 55. A method for transmitting uplink control information, including:
determining at least two transmission occasions of an uplink control channel and channel access types of the at least two transmission occasions by a terminal equipment; and
in at least one of the at least two transmission occasions, transmitting the uplink control information to a network device according to the channel access type.

Supplement 56. The method according to supplement 55, wherein the transmission occasions are time-frequency resources having different frequency domain positions or different time domain positions and used for transmitting the uplink control information.

Supplement 57. The method according to supplement 55 or 56, wherein the terminal equipment determines a channel access type of a first transmission occasion in the at least two transmission occasions according to an indication of the network device.

Supplement 58. The method according to supplement 57, wherein the terminal equipment determines a channel access type of a second transmission occasion other than the first transmission occasion in the at least two transmission occasions according to at least one of the following:
a channel detection condition of a transmission occasion preceding the second transmission occasion; and
whether the second transmission occasion is within a channel occupation time of the network device.

Supplement 59. The method according to any one of supplements 55-58, wherein the channel access type is independently configured or defined for the at least two transmission occasions respectively.

Supplement 60. The method according to any one of supplements 55-59, wherein the at least two transmission occasions are allocated on unit bandwidths having different frequency domains and used for channel detection.

Supplement 61. A terminal equipment, including a memory and a processor, the memory storing a computer program, and the processor being configured to execute the computer program to carry out the method for transmitting uplink control information as described in any one of supplements 1-30 and 55-60 or the information indication method as described in any one of supplements 45-54.

Supplement 62. A network device, including a memory and a processor, the memory storing a computer program, and the processor being configured to execute the computer program to carry out the method for receiving uplink control information as described in any one of supplements 31-44.

What is claimed is:

1. An apparatus for transmitting uplink control information, applicable to a terminal equipment, comprising:
a memory; and
processor circuitry coupled to the memory and configured to:
receive configuration information transmitted via RRC signaling and used for configuration of one or a plurality of channel access types for PUCCHs used for transmitting HARQ feedback information, wherein the one or the plurality of channel access types comprising at least one of the following: a first channel access type not performing channel detection, a second channel access type containing a detection interval, a third channel access type containing a detection interval and a contention window;
determine a channel access type of a PUCCH used for transmitting HARQ feedback information from the one or the plurality of channel access types configured by the configuration information; and
according to the channel access type of the PUCCH, transmit the PUCCH after a corresponding channel is detected as being idle, or transmit the PUCCH without detecting the corresponding channel.

2. The apparatus according to claim 1, wherein the PUCCH is transmitted by using an unlicensed spectrum.

3. The apparatus according to claim 1, wherein the processor circuitry is further configured to receive a DCI indicating the channel access type of the PUCCH from the one or the plurality of channel access types configured by the configuration information.

4. The apparatus according to claim 1, wherein the configuration information is included in UE-specific PUCCH configuration.

5. The apparatus according to claim 4, wherein the one or the plurality of channel access types are configured for at least one PUCCH resource and/or formats configured by the PUCCH configuration.

6. The apparatus according to claim 1, wherein the channel access type is predefined.

7. The apparatus according to claim 1, wherein the processor circuitry is further configured to:
determine that there exists a hidden node of a network device; and
indicate that there exists the hidden node of the network device.

8. The apparatus according to claim 7, wherein the processor circuitry is further configured to determine not to transmit uplink control information by using the first channel access type not performing channel detection, or not to expect that the network device schedules uplink transmission of the first channel access type not performing channel detection.

9. The apparatus according to claim 7, wherein the hidden node of the network device is one or more transmission devices; and
when the transmission device(s) transmit(s) signals, the network device is unable to detect that a channel is occupied by the transmission device(s), and the terminal equipment is able to detect that the channel is occupied by the transmission device(s).

10. The apparatus according to claim 7, wherein,
the processor circuitry is further configured to, via first indication information of the network device, determine to perform detection on a channel; and
the processor circuitry is further configured to, when the channel is detected as being idle, transmit second indication information indicating that the channel is idle to the network device.

11. The apparatus according to claim 1, wherein the processor circuitry is further configured to determine at least two transmission occasions of the PUCCH and channel access type of the at least two transmission occasions; and
the processor circuitry is further configured to, in at least one of the at least two transmission occasions, transmit the PUCCH to the network device according to the channel access type.

12. The apparatus according to claim 11, wherein the processor circuitry is further configured to:
determine a channel access type of a first transmission occasion in the at least two transmission occasions according to an indication of a network device, and determine a channel access type of a second transmission occasion other than the first transmission occasion in the at least two transmission occasions according to at least one of the following: a channel detection condition of a transmission occasion preceding the second transmission occasion, whether the second transmission occasion is within a channel occupation time of the network device.

13. The apparatus according to claim 11, wherein the channel access type is independently configured or defined for the at least two transmission occasions respectively, and/or the at least two transmission occasions are allocated on unit bandwidths having different frequency domains and used for channel detection.

14. An apparatus for receiving uplink control information, applicable to a network device, comprising:

a memory; and processor circuitry coupled to the memory and configured to:

transmit configuration information via RRC signaling, the configuration information is used for configuration of one or a plurality of channel access types for PUCCHs used for transmitting HARQ feedback information by a terminal equipment, wherein the one or the plurality of channel access types comprising at least one of the following: a first channel access type not performing channel detection, a second channel access type containing a detection interval, a third channel access type containing a detection interval and a contention window; and receive a PUCCH with HARQ feedback information transmitted by the terminal equipment, wherein the PUCCH is transmitted, according to a channel access type of the PUCCH which is determined from the one or the plurality of channel access types, after a corresponding channel is detected as being idle by the terminal equipment, or without detecting the corresponding channel by the terminal equipment.

15. The apparatus according to claim 14, wherein the processor circuitry is further configured to transmit a DCI indicating the channel access type of the PUCCH from the one or the plurality of channel access types configured by the configuration information.

16. The apparatus according to claim 14, wherein the configuration information is included in UE-specific PUCCH configuration.

17. A communication system, comprising:

a terminal equipment comprises the apparatus according to claim 1; and a network device comprises apparatus for receiving uplink control information configured to:

transmit configuration information via RRC signaling the configuration information is used for configuration of one or a plurality of channel access types for PUCCHs used for transmitting HARQ feedback information by a terminal equipment wherein the one or the plurality of channel access types comprising at least one of the following: a first channel access type not performing channel detection, a second channel access type containing a detection interval a third channel access type containing a detection interval and a contention window; and receive a PUCCH with HARQ feedback information transmitted by the terminal equipment, wherein the PUCCH is transmitted, according to a channel access type of the PUCCH which is determined from the one or the plurality of channel access types, after a corresponding channel is detected as being idle by the terminal equipment, or without detecting the corresponding channel by the terminal equipment.

\* \* \* \* \*